(12) United States Patent
Eiland et al.

(10) Patent No.: US 11,907,030 B2
(45) Date of Patent: Feb. 20, 2024

(54) SYSTEMS AND METHODS TO DETERMINE SYSTEM AIRFLOW USING FAN CHARACTERISTIC CURVES

(71) Applicant: DELL PRODUCTS L.P., Round Rock, TX (US)

(72) Inventors: Richard Eiland, Austin, TX (US); Hasnain Shabbir, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 265 days.

(21) Appl. No.: 17/146,428

(22) Filed: Jan. 11, 2021

(65) Prior Publication Data

US 2022/0221916 A1 Jul. 14, 2022

(51) Int. Cl.
*G06F 1/20* (2006.01)

(52) U.S. Cl.
CPC ...... *G06F 1/20* (2013.01); *G05B 2219/49216* (2013.01)

(58) Field of Classification Search
CPC ............ G06F 1/20; G06F 1/203; G06F 1/206
See application file for complete search history.

(56) References Cited

U.S. PATENT DOCUMENTS

| | | | |
|---|---|---|---|
| 8,156,358 B2 | 4/2012 | Brumley et al. | |
| 9,494,954 B2 | 11/2016 | Artman et al. | |
| 9,785,208 B2 | 10/2017 | Lovicott et al. | |
| 10,372,575 B1 | 8/2019 | North et al. | |
| 10,499,540 B2 | 12/2019 | North et al. | |
| 2009/0175004 A1* | 7/2009 | Li | G05D 23/19 361/695 |
| 2012/0224322 A1 | 9/2012 | Artman et al. | |
| 2013/0176680 A1 | 7/2013 | Lovicott et al. | |
| 2014/0032011 A1 | 1/2014 | Artman et al. | |
| 2014/0240913 A1* | 8/2014 | Vyshetsky | G06F 1/206 361/679.31 |
| 2016/0328349 A1* | 11/2016 | Kunnathur Ragupathi | G06F 1/266 |
| 2017/0273215 A1* | 9/2017 | Shabbir | G06F 1/203 |
| 2018/0348829 A1* | 12/2018 | Curtis | H05K 7/20727 |
| 2021/0149476 A1* | 5/2021 | Alton | G06F 1/329 |
| 2021/0293247 A1* | 9/2021 | Uno | F04D 25/06 |

\* cited by examiner

*Primary Examiner* — Mark A Connolly
(74) *Attorney, Agent, or Firm* — Egan, Enders & Huston LLP.

(57) ABSTRACT

Disclosed herein are systems and methods that may be implemented in real time to determine the total volumetric rate of airflow through a chassis enclosure of an information handling system platform directly from real time measured cooling fan power consumption in combination with stand-alone or system-level cooling fan power characteristics (e.g., expressed as cooling fan power curves) that relate cooling fan volumetric airflow rate to cooling fan power consumption at the current fan rotation speed. This determined value of total real time volumetric airflow rate may then be used, for example, by individual system level thermal control algorithms and/or data center level thermal control algorithms.

24 Claims, 12 Drawing Sheets

SYSTEMS AND METHODS TO DETERMINE SYSTEM AIRFLOW USING FAN CHARACTERISTIC CURVES

FIELD

This invention relates generally to information handling systems and, more particularly, to cooling air flow within information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One or more cooling fans are typically employed within the electronic chassis enclosure of information handling system platforms, such as network servers, to supply airflow to cool components that are operating within the information handling system chassis. Examples of such components include Peripheral Component Interconnect Express (PCIe) cards that are plugged into mating PCIe slots within the chassis enclosure of the information handling system.

Multiple servers are often grouped and operated together within a data center. Airflow consumption for cooling individual servers within such a data center is tightly coupled to data center capacity and facility resources, and data center operators benefit from having access to real time reporting of estimated airflow from individual servers. In addition, system control algorithms also benefit from real-time estimated airflow reporting which may then be used for PCIe inlet and system exhaust temperatures (bulk) determination.

A conventional method for estimating volumetric airflow rate consumed by a single given server system platform configuration is to use a conventional predefined correlation of the system airflow as a function of the system cooling fan speed for the given server system platform configuration to estimate the server system volumetric airflow rate from the real time known system cooling fan speed. Such a conventional predefined correlation is developed in the laboratory from static data that is collected for a single given discrete system platform configuration that includes a particular combination of storage drive/s, rear input/output connections, processor types, number of processors, etc.

Using conventional techniques, each unique server system platform configuration must be separately characterized in the laboratory by the server system manufacturer or assembler in order to develop a conventional predefined correlation of volumetric system airflow rate versus cooling fan speed for that unique server system platform configuration. This characterization is made in the laboratory by measuring cooling fan speed (% pulse width modulation "PWM") versus airflow (cubic feet per minute "CFM") for each different type (e.g., different type, different size, different motor horsepower, etc.) of cooling fan that is present in the given server system platform, i.e., each unique server system platform configuration typically includes multiple different configurations of cooling fans that must be characterized. As shown in FIG. 1, this laboratory characterization process for a unique server system platform configuration must be performed multiple times (e.g., for a total of two to three times), once for each different configuration of cooling fan that is present in the given server system platform. The resulting correlation of cooling fan speed versus volumetric airflow rate for the unique server system platform configuration is then input into a table for the baseband management controller (BMC) to reference from. The resulting correlations of the conventional methodology are only valid for a single unique given server system platform configuration, which means that this conventional characterization process must be repeated (e.g., for a total of five to ten times), once for each other possible unique server system platform configuration that may be manufactured and deployed in the field.

FIG. 2 shows how the conventional laboratory characterization process of FIG. 1 must be repeated by the server system manufacturer or assembler for any new unique server system platform configuration that is developed after product is officially released to the customer. The table for the BMC must then be updated to include the resulting correlation of cooling fan speed versus volumetric airflow rate that is obtained from the characterization of the new unique server system platform configuration.

Once developed, each given conventional correlation of cooling fan speed versus volumetric airflow rate that is developed as described above is only valid for estimating airflow from a server system that has the same unique discrete system configuration for which the given conventional predefined correlation was developed in the laboratory. Further, each given conventional predefined correlation is used to estimate airflow based only on system cooling fan speed. Development and use of such conventional correlations takes precious development time and expenses, and each developed correlation of cooling fan speed versus volumetric airflow rate is only valid for estimating volumetric airflow rate consumed by a single unique and discrete server configuration.

SUMMARY OF THE INVENTION

Disclosed herein are systems and methods that may be implemented in real time to determine the volumetric rate of airflow through a chassis enclosure of an information handling system platform directly from real time measured cooling fan power consumption in combination with stand-alone or system-level cooling fan power characteristics (e.g., expressed as cooling fan power curves) that relate cooling fan volumetric airflow rate to cooling fan power consumption at the current fan rotation speed. In one embodiment, distinct characteristics of individual cooling fan performance may be used in this manner to determine the real time volumetric airflow rate of each individual cooling fan from its respective measured individual real time power consumption at its current fan rotation speed while it is circulating air through a chassis enclosure of an information handling system platform. The individually-determined cooling fan volumetric airflow rates of all the separate system cooling fans may then be summed or added together to determine the total real time volumetric airflow rate that is currently passing through the chassis enclosure of the information handling system platform. This determined value of total real time volumetric airflow rate may then be used, for example, by individual system level thermal control algorithms and/or data center level thermal control algorithms.

In another embodiment, performance of all system cooling fans circulating air through a chassis enclosure of an information handling system platform may be considered together and used to determine total real time volumetric airflow rate that is currently passing through the chassis enclosure of the information handling system platform. In this embodiment, the real time total power consumption of all system cooling fans may be measured together while all system cooling fans are rotating at the same speed, e.g., in a case where individual cooling fan power measurements are not available. The total real time volumetric airflow rate that is currently passing through the chassis enclosure of the information handling system platform may then be determined at the current uniform fan rotation speed of all system fans from total system cooling fan power characteristics (e.g., expressed as total system power curves) that relate total system cooling fan volumetric airflow rate to total cooling fan power consumption of all system cooling fans at their current uniform fan rotation speed.

In one embodiment, the disclosed systems and methods may be implemented to provide increased flexibility for system and data center operations by allowing continuous measurement of real time volumetric airflow rate without using the conventional characterization methodology that requires collection of static data for each different discrete system platform configuration. Since no additional system platform characterization is required for each different system platform configuration, no additional system platform characterization steps are required to allow measurement of system platform volumetric airflow rate when new unique system platform configurations are introduced after product is officially released to the customer by a manufacturer or assembler of a system platform (e.g., for inclusion in a lookup table that describes a correlation between fan speed versus airflow versus PCIe inlet airflow matched to a given system configuration that may be accessed by a baseband management controller (BMC)). Each of such unique system platform configurations may have different combinations of chassis enclosure characteristics and/or internal system components (e.g., such as storage drive/s, processor type/s, number of processors, types of rear input/output connections, etc.). However, the disclosed systems and methods may be implemented to determine real time total volumetric rate of airflow through a chassis enclosure of an information handling system platform regardless of differences in specific information handling system platform configurations, such as different configurations of storage drive/s, rear input/output connections, processor type/s, number of processors etc.

In one respect, disclosed herein is an information handling system, including: a chassis enclosure; at least one cooling fan configured to operate at multiple rotational speeds to provide different flow rates of cooling air within the chassis enclosure to cool one or more heat-producing components within the chassis enclosure; and at least one programmable integrated circuit that is coupled to the at least one cooling fan. The programmable integrated circuit may be programmed to: determine a current real time rotational speed of the at least one cooling fan and a current real time value of electric power consumed by the at least one cooling fan; and determine a current real time volumetric airflow rate provided within the chassis enclosure by the at least one cooling fan as a function of the determined current real time value of electric power consumption of the at least one cooling fan and the determined current rotational speed of the at least one cooling fan.

In another respect, disclosed herein is a method including: operating at least one cooling fan to provide airflow within a chassis enclosure of an information handling system to cool one or more heat-producing components within the chassis enclosure; determining a current real time rotational speed of the at least one cooling fan and a current real time value of electric power consumed by the at least one cooling fan; and determining a current real time volumetric airflow rate provided within the chassis enclosure by the at least one cooling fan as a function of the determined current real time value of electric power consumption of the at least one cooling fan and the determined current rotational speed of the at least one cooling fan.

DESCRIPTION OF ILLUSTRATIVE EMBODIMENTS

Figure 3:
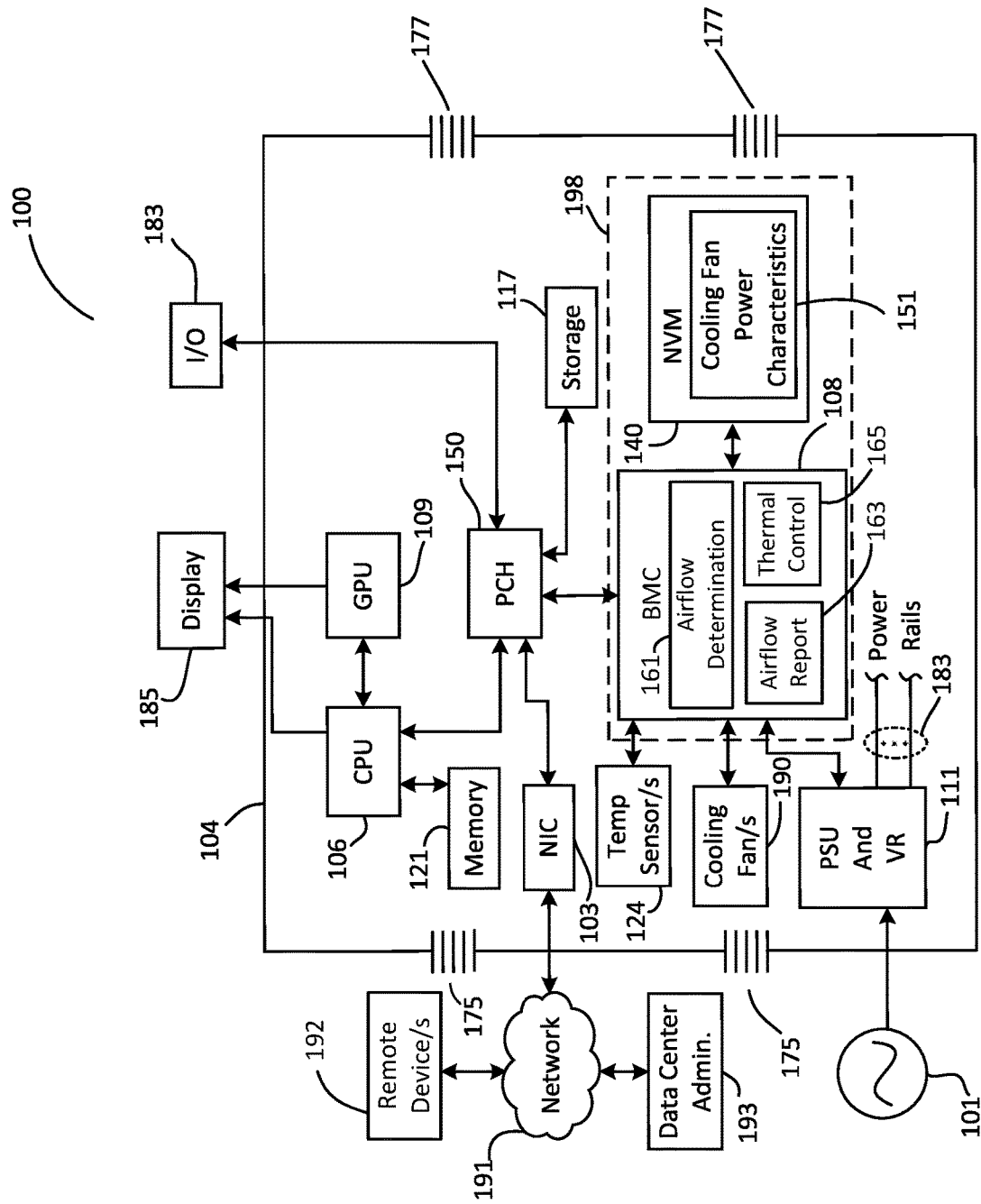
FIG. 3 illustrates a block diagram of an information handling system platform according to one exemplary embodiment of the disclosed systems and methods.

FIG. 3 illustrates one exemplary embodiment of an information handling system platform 100 configured in this embodiment as a server platform, although the disclosed systems and methods may be implemented with other types of information handling system configurations such as desktop or tower computer configurations, workstation configurations, notebook computer configurations, etc. As shown, system platform 100 includes individual and discrete heat-producing electrical components (e.g., components 103, 106, 108, 109, 111, 117, 121, 140, 150, etc.) and one or more variable speed cooling fans 190 (e.g., axial fans, centrifugal fans, blower fans, etc.) that are configured to cool at least a portion of these respective heat-producing components, e.g., based on sensed and reported real time temperature information provided from temperature sensor/s 124 that may be positioned within the airflow of the cooling fans 190 and/or that may sense the operating temperature of one or more of the heat-producing temperature sensors 124.

In the illustrated embodiment of FIG. 3, each of the cooling fan/s 190, temperature sensor/s 124 and individual heat-producing components are contained within a chassis enclosure 104 (e.g., plastic enclosure, sheet metal enclosure, etc.) that encloses internal components of the information handling system 100 therein. Examples of chassis enclosures 104 include, but are not limited to, 2U, 3U, 4U computer chassis, tower or desktop computer chassis, etc.). As shown, the cooling fan/s 190 are provided to cool the heat-producing components by circulating cooling air through the interior of chassis enclosure 104 from cooling air inlets 175 to cooling air outlets 177 that are defined through the walls of chassis enclosure 104. One or more of the cooling fans 190 may be of different configuration (e.g., different type, different size, different motor horsepower, etc.) than one or more of the other cooling fans 190, and/or may be rotating at different speeds from each other at any given time.

Examples of heat-producing components illustrated in the embodiment of FIG. 3 include a host programmable integrated circuit 106, video/graphics hardware (e.g., discrete graphics processing unit or video card/s) 109, volatile memory (e.g., DRAM dual in-line memory module/s) 121, system power supply and voltage regulator/s 111, storage device/s (e.g., solid state drive "SSD", hard drive, optical drive, etc.) 117, persistent or non-volatile (e.g., non-volatile RAM) memory 140, an out-of-band programmable integrated circuit 108 in the form of a baseboard management controller "BMC" (e.g., with other possible examples being a service processor, embedded processor, etc.), and a network interface controller (NIC) 103. Together, BMC 108 and non-volatile memory 140 may be configured as a remote access controller 198, e.g., such as an integrated Dell Remote Access Controller (iDRAC) available from Dell Technologies of Round Rock, Tex., etc., in which case non-volatile memory 140 may store, among other things, remote access controller component firmware.

Still referring to FIG. 3, power supply and voltage regulator/s (PSU and VR) 111 supplies power to all power-consuming components of system 100 within chassis enclosure 104 via power rails 183, including cooling fan/s 190 and heat-producing electrical components of system 100. It will be understood that other types and combinations of heat-producing components are possible, e.g., a given system 100 may be provided with two or more PSU's 111 for supplying all the power-consuming components of system 100 and/or two or more host programmable integrated circuits 106. In one embodiment, out-of-band programmable integrated circuit 108 may be coupled and configured to monitor and/or control (and thus be aware of) total power provided by the one or more PSUs 111 to power all the power-consuming components of system 100, and may also be coupled and configured to monitor and/or control (and thus be aware of) real time power consumption by individual power-consuming components (e.g., such as individual cooling fans 190). In this regard, programmable integrated circuit 108 may be configured to directly monitor power consumption of an individual power-consuming component and/or may be configured to receive reported component power consumption from another intervening component (e.g., chassis power manager) of system 100, e.g., such as described in U.S. Pat. No. 8,156,358 which is incorporated herein by reference in its entirety for all purposes.

Referring now in more detail to the embodiment of FIG. 3, host programmable integrated circuit 106 is configured in this embodiment as a central processing unit (CPU) that executes an operating system (OS) for system 100. CPU 106 may include, for example, an Intel Xeon series processor, an Advanced Micro Devices (AMD) processor or another type of programmable integrated circuit. In FIG. 3, optional GPU 109 is coupled in signal communication with CPU 106 (e.g., by conductor including PCI-Express lanes, power supply bus, power, thermal and system management signals, etc.) to transfer instructions and data for generating video images from CPU 106 to the GPU 109. Optional GPU 109 may be an NVidia GeForce series processor, an AMD Radeon series processor, or another type of programmable integrated circuit that is configured to perform graphics processing tasks and provide a rendered video image (e.g., as frame buffer data) by output digital video signals (e.g., HDMI, DVI, SVGA, VGA, etc.) to display device 185 (e.g., LED display, LCD display, or other suitable type of display device) of system 100. It will be understood that in other embodiments CPU 106 may alternatively provide video images directly to display 185, including in those cases where optional GPU 109 is not present.

Still referring to the exemplary embodiment of FIG. 3, CPU 106 is shown coupled to system memory 130 via a data channel. System memory 130 may include, for example, random access memory (RAM), read only memory (ROM), dynamic RAM (DRAM), synchronous DRAM (SDRAM), and/or other suitable storage mediums. CPU 106 is also coupled to platform controller hub (PCH) 150, which facilitates input/output functions for information handling system 100. Local system storage 117 (e.g., one or more media drives such as solid state drives, hard disk drives, optical drives, etc.) are each coupled to PCH 150 to provide non-volatile storage for the information handling system 100. Optional input/output devices 183 (e.g., a keyboard, mouse, touchscreen, etc.) may be coupled to PCH 150 as shown to enable a local system user to interact with components of information handling system 100 including application programs or other software/firmware executing thereon. Also shown coupled to PCH 150 is network interface controller (NIC) 103 that may be present to allow CPU 106 and/or BMC 108 to wired and/or wirelessly communicate with other remote information handling system devices such as data center administrative system 193 and client information handling systems 192 across network 191 which may be the Internet, corporate intranet or other suitable network communication medium In the embodiment of FIG. 3, out-of-band programmable integrated circuit 108 is provided in the form of a baseboard management controller "BMC" (e.g., with other possible examples being a service processor, embedded processor, etc.). As shown, BMC 108 is coupled to non-volatile memory or persistent storage 140. BMC 108 is also coupled to PCH 150 by a data bus and is configured to perform out-of-band and system tasks including, but not limited to, providing control signals to control cooling fan speed and to control operation of power supply/voltage regulation circuitry 111 that itself receives external power (e.g., such as alternating current from AC mains 101 as shown) and in turn provides suitable regulated and/or converted direct current power via power rails 183 for operating the system power-consuming components. As used herein, an out-of-band programmable integrated circuit is separate and independent from any in-band host central processing unit (CPU) that runs the host OS of the information handling system, and without management of any application executing with a host OS on the host CPU.

Figure 1:
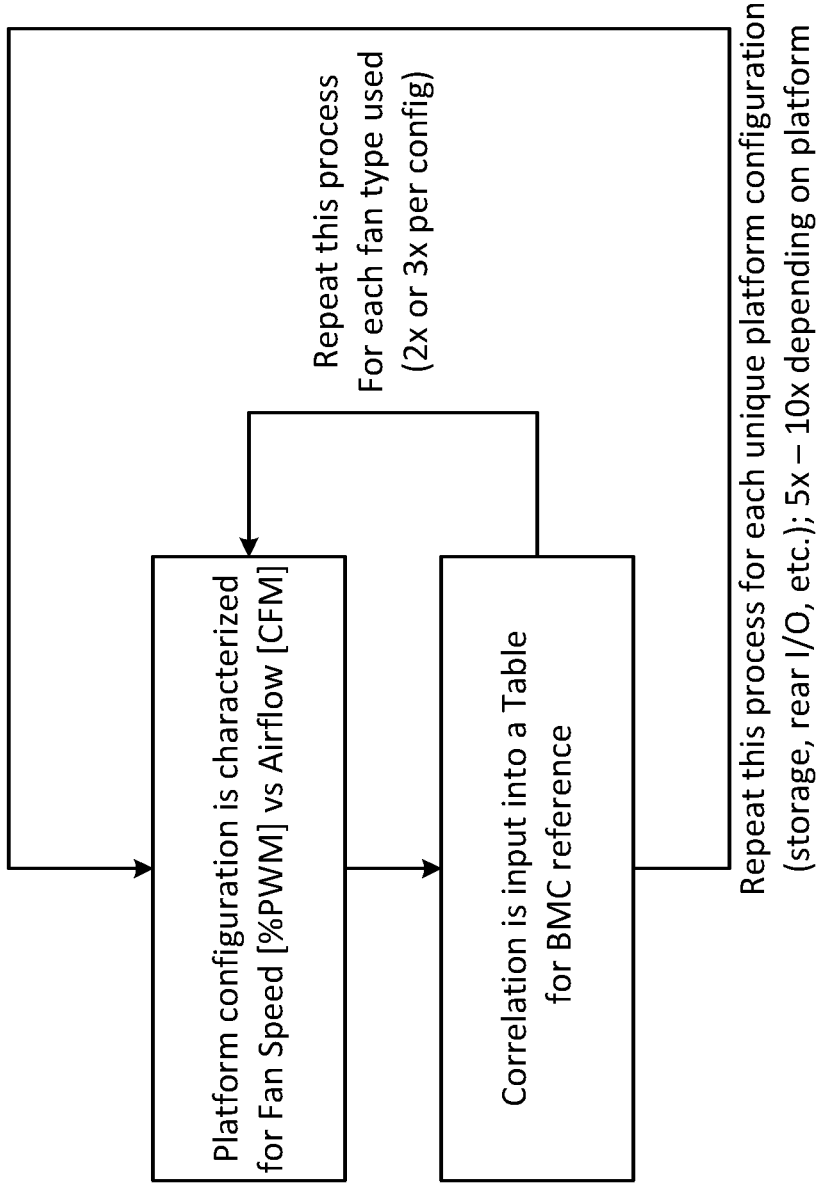
FIG. 1 illustrates conventional methodology.
Figure 2:
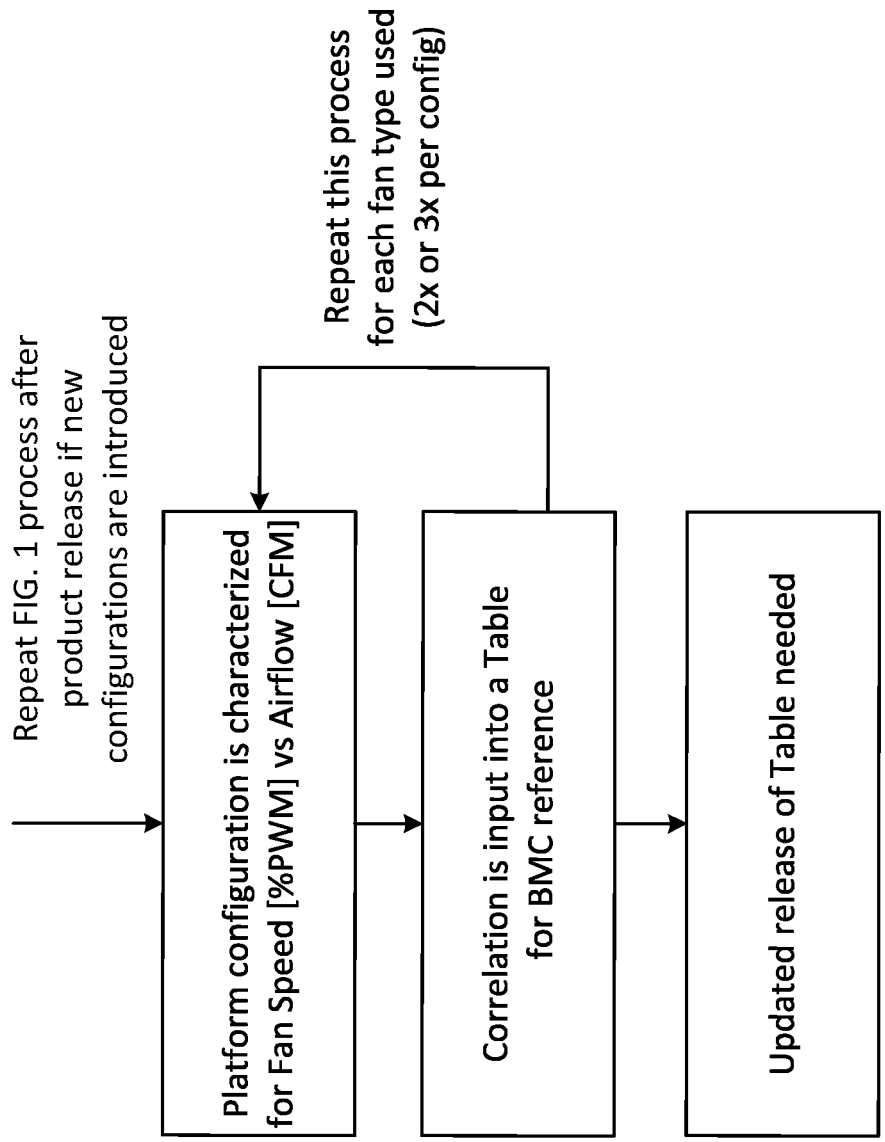
FIG. 2 illustrates conventional methodology.
Figure 4A:
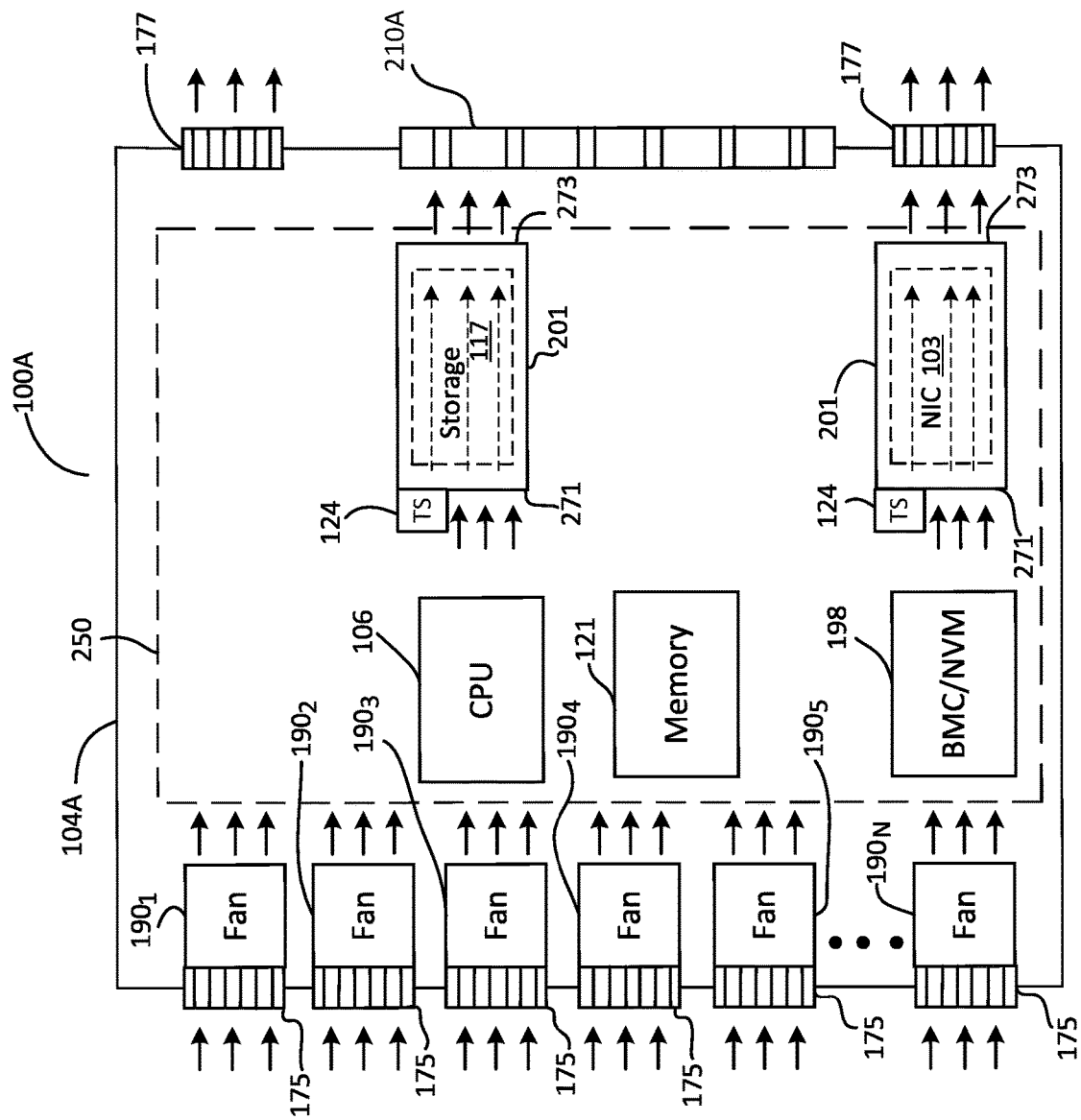
FIG. 4A illustrates an overhead block diagram view of an exemplary embodiment of an information handling system chassis enclosure according to one exemplary embodiment of the disclosed systems and methods.

FIG. 4A illustrates an overhead view of an exemplary embodiment of a chassis enclosure 104A of an information handling system 100A with its top wall removed. In FIG. 2, information handling system 100A is configured with multiple heat-producing components within chassis enclosure 104A. Information handling system 100A also includes multiple expansion slots 201 (e.g., PCIe slots) that may be provided on system motherboard 250 within chassis enclosure 104A, with a respective mating expansion card (e.g., mating PCIe card) that includes a heat-producing component inserted into each expansion slot 201 that in this embodiment includes a storage device 117 and NIC 103. Other heat-producing components present within chassis enclosure 104A of FIG. 2 include CPU package 106 (received in corresponding CPU socket on motherboard 250), memory 121 (e.g., one or more dual in-line memory modules "DIMMs" received within corresponding DIMM slots on motherboard 250), and remote access controller 198 (e.g., including BMC 108 and its NVM 140) that may be integrated on the motherboard 250. Not shown is PSU and VR 111 which may be present within chassis enclosure 104A and cooled with one or more dedicated cooling fan/s integrated with the PSU/VR 111. It will be understood that number and identity of heat-producing components illustrated in the embodiment of FIG. 4A are exemplary only, and that the number and location of expansion slots 201 and/or the identity of heat-producing components inserted within each expansion slot 201 may vary in other embodiments. For example, in an alternate embodiment, a PSU may be located external to the chassis enclosure 104A and coupled to a VR and power rails that are integrated within chassis enclosure 104A.

For purposes of illustration and example only, the expansion slots 201 and mating expansion cards will be described below as being Peripheral Component Interconnect Express (PCIe) slots and mating PCIe cards. However, it will be understood that in other embodiments, other types and configurations of expansion slots 201 and mating expansion cards (e.g., corresponding to different types of computer expansion bus configurations) may be similarly employed (or substituted) in place of PCIe slots and PCIe cards in the embodiments described herein. In such other embodiments, a given type expansion slot 201 may be coupled to a corresponding type of computer expansion bus for exchanging signals such as data, power, etc.

Computer expansion card slots 201 and computer expansion cards configured for mating with expansion slots 201 may include, for example, high-speed serial computer expansion bus slots such as Peripheral Component Interconnect Express (PCIe) slots and mating PCIe cards configured according to PCIe 1.0, 2.0, 3.0 4.0, 5.0, etc. standards available from the Peripheral Component Interconnect Special Interest Group (PCI-SIG). In one PCIe embodiment, possible form factors for PCIe slots 201 include, but are not limited to, x1, x2, x4, x8 and x16 sized PCIe slots, in which the "x" prefix identifies the lane count (or number of differential signaling pairs) present in a particular PCIe slot 201, e.g., "x16" represents a 16-lane card or slot. In this regard, a given PCIe card will fit into a PCIe slot 201 that has its same physical size (i.e., its same lane count) or a larger size. In other embodiments, a PCIe slot 201 may be configured with other form factors that utilize a PCIe high speed serial computer expansion bus standard, e.g., such as PCI Express Mini Card form factor.

In the embodiment of FIG. 4A, chassis enclosure 104A may be, for example, a rack mount 1U or 2U server chassis, although a chassis enclosure 104A may be configured in other sizes and shapes, e.g., including larger server chassis (e.g., 3U, 4U, 5U, 6U, 7U, etc.), desktop or tower chassis enclosure, etc. As shown in FIG. 4A, multiple cooling fans $190_1$ to $190_N$ (e.g., provided as a gang of cooling fans $190_1$ to $190_N$) may be present to draw in cooling air though air inlets 175 from outside chassis enclosure 104A and pass the cooling air past and in contact with the heat-producing components within chassis enclosure 104A, then to be expelled out of chassis enclosure 104A through air outlets 177 in the direction of the arrows as shown. In one embodiment, each of the given PCIe slots 201 may be an enclosed slot, e.g., with solid slot enclosure walls and open ends or otherwise defining an enclosed airflow path due to adjacent structures, adjacent-mounted PCIe cards, etc. In FIG. 2, each of PCIe slots 201 has an open inlet end 271 and an open outlet end 273 that allow cooling air to pass through the enclosed airflow path (e.g., between the slot enclosure walls) of the respective slot 201 over its inserted PCIe card (which are each shown in dashed hidden line outline in FIG. 2). The enclosed airflow path through each of PCIe slots 201 is illustrated by the dashed arrows in FIG. 4A.

Still referring to FIG. 4A, exemplary inlet vents 175 and outlet vents 177 are shown defined in the enclosure wall of chassis enclosure 104A. Inlet vents 175 are provided to allow fan/s 190 to draw ambient cooling air into chassis enclosure 104A from the atmosphere surrounding outside chassis enclosure 104A so that it may be circulated by fan/s 190 across the heat-producing components within the enclosure 104A. Outlet vents 177 are provided to allow this air that has been heated by transfer of heat from the heat-producing components fan/s 190 to be exhausted back to the outside atmosphere around chassis enclosure 104A. It will be understood that the illustrated number and configuration of vents 175 and 177 (and their relationship to fan/s 190 and fan zones 105) is exemplary only, and that any other number and/or configuration of inlet and outlet vents 175 and 177 is possible that is suitable for allowing circulation of cooling air across the heat-producing component/s of each cooling fan zone 105, and that each fan 190 does not need to have an exclusive designated vent 175 or 177.

Also shown in FIG. 4A are rear input/output connections 210A that provide connectivity for data and power signals between components within chassis enclosure 104A of information handling system 100A and external devices, regulated power supply, AC mains, etc.

In FIG. 4A, each of PCIe cards (e.g., 103 and 117) of FIG. 4A may or may not have integrated temperature sensors that are configured to sense real time operating temperature of the respective heat-producing component of each PCIe card. As further shown in FIG. 4A, a respective temperature sensor 124 may optionally be positioned at (or adjacent) the boundary of the inlet 271 of each respective PCIe slot 201 to sense and report real time current temperature at the inlet boundary of each of PCIe slots 201. One or more data buses or other suitable communication media path may also be provided (e.g., as shown in FIG. 3) for allowing communication of data (e.g., sensed temperature data, component operational power consumption data, fan speed data, digital fan speed control signals) between the various components of information handling system 100A.

Further examples of types and configurations of heat-producing components, temperature sensors, and cooling fan configurations may be found, for example, in United States Patent Application Publication Number 2014/0032011; United States Patent Application Publication Number 2013/0176680; United States Patent Application Publication Number 2012/0224322; and in U.S. Pat. No. 9,785,208; each of which is incorporated herein by reference in its entirety for all purposes.

Figure 4B:
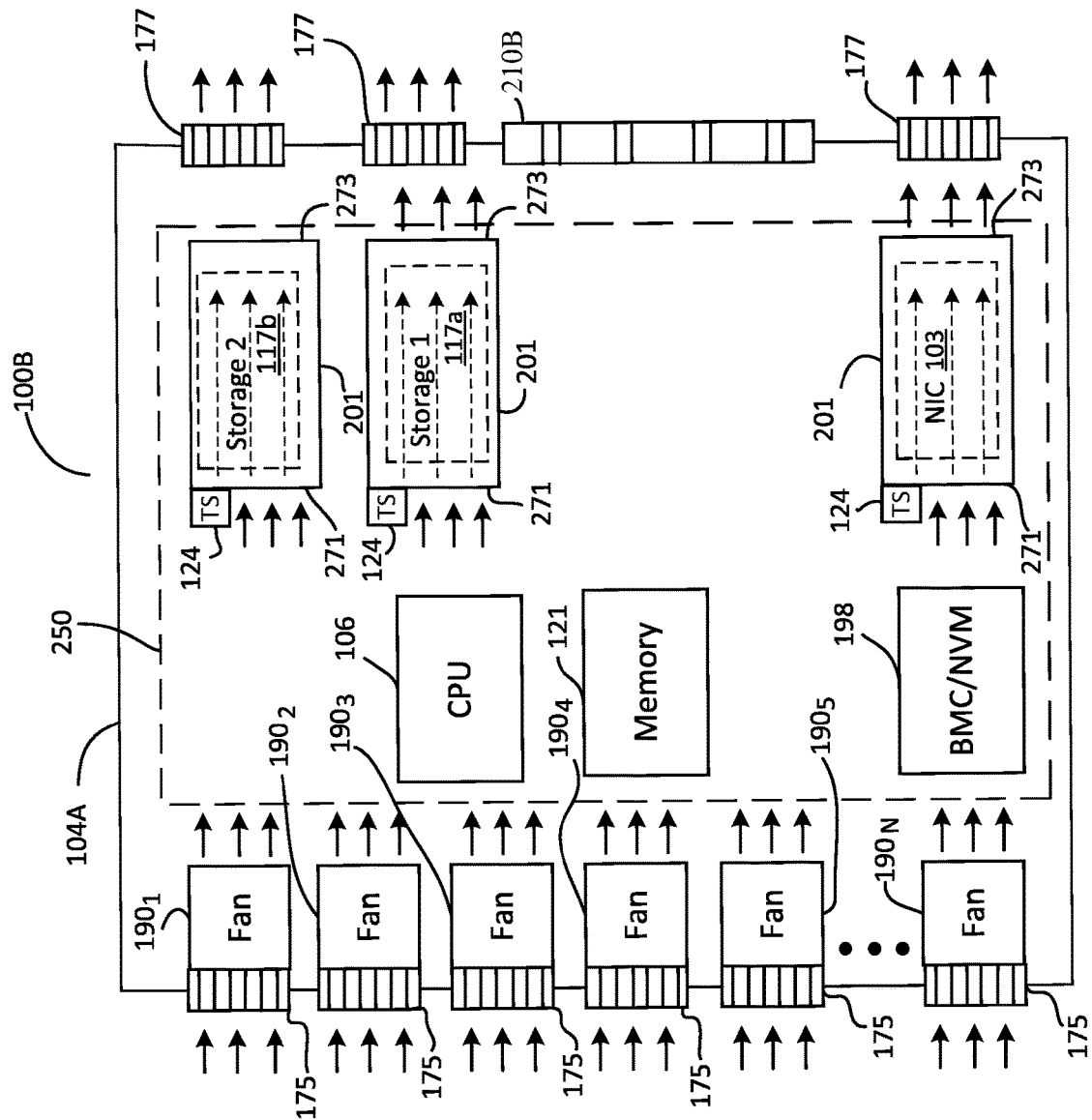
FIG. 4B illustrates an overhead block diagram view of an exemplary embodiment of an information handling system chassis enclosure according to one exemplary embodiment of the disclosed systems and methods.

FIG. 4B illustrates an overhead view of another exemplary embodiment of a chassis enclosure 104B of an information handling system 100B with its top wall removed. In FIG. 4B, information handling system 100B is provided with a second configuration of multiple heat-producing components (e.g., including two local system storage devices 117a and 117b) within chassis enclosure 104B that is different from the first configuration of heat-producing components within chassis enclosure 104A of information handling system 100A of FIG. 4A. In the embodiment of FIG. 4B, chassis enclosure 104B is also provided with rear input/output connections 210B that are configured differently than the rear input/output connections 210A of FIG. 4A. Chassis enclosure 104B is also provided with a different number and configuration of air outlets 177 than is chassis enclosure 104A of FIG. 4A.

Due to the different configuration of heat-producing components, rear input/output connections and air outlets, a conventional cooling fan speed versus volumetric airflow rate correlation for the embodiment of FIG. 4A would be different from a conventional cooling fan speed versus volumetric airflow rate correlation for the embodiment of FIG. 4B. This means that a conventional cooling fan speed versus volumetric airflow rate correlation for the chassis enclosure embodiment 104A of FIG. 4A cannot be used to estimate cooling fan airflow for the chassis enclosure embodiment 104B of FIG. 4B (and vice-versa). Thus, if using conventional cooling fan air flow estimation techniques, a separate and different conventional cooling fan speed versus volumetric airflow rate characterization process must therefore be performed in the laboratory for each of chassis enclosure 104A and chassis enclosure 104B. In contrast, embodiments of the disclosed systems and methods advantageously do not require performance of such separate characterization processes to allow determination of cooling fan airflow for the separate embodiments of FIGS. 4A and 4B.

Figure 5:
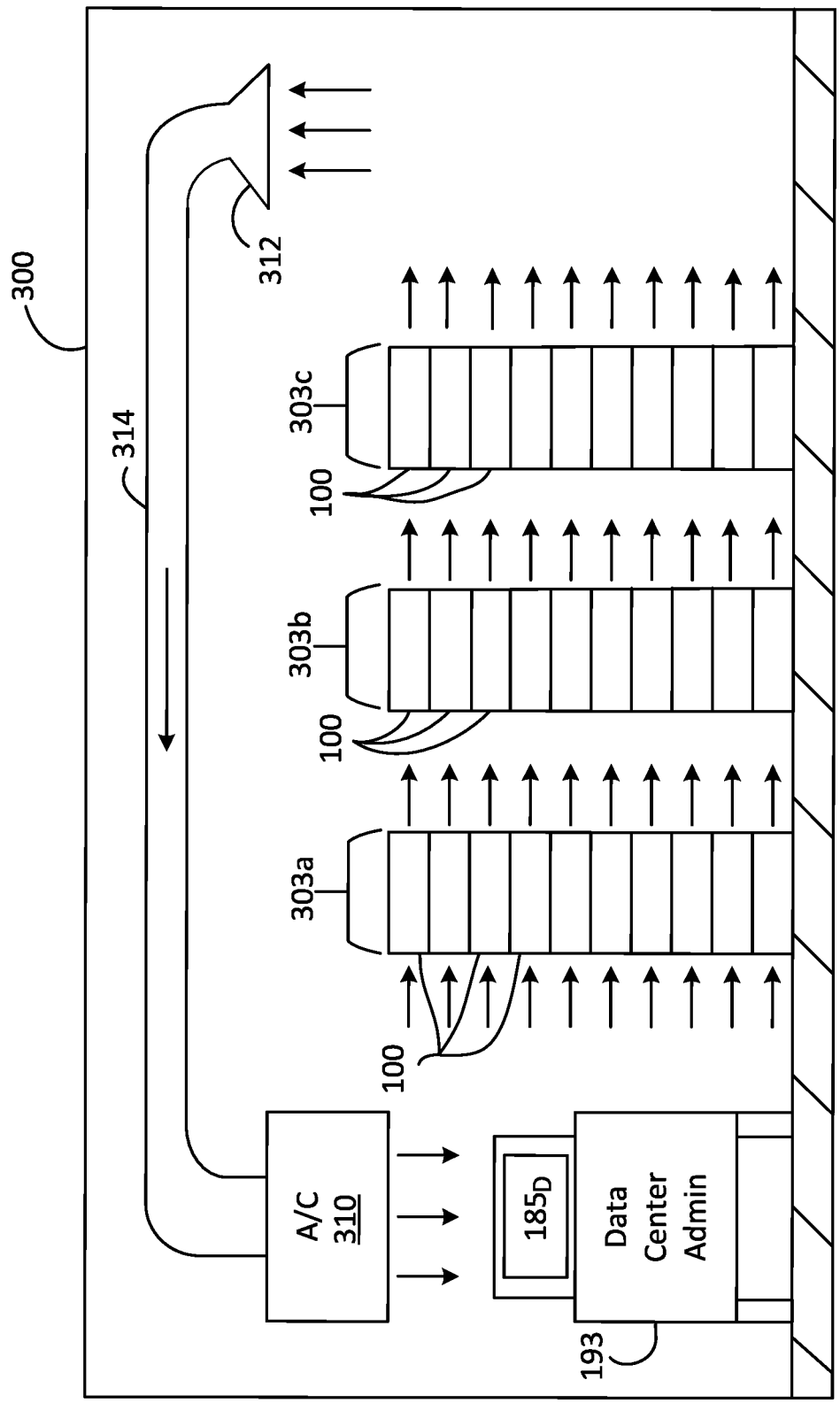
FIG. 5 illustrates a simplified representation of a data center and its components according to one exemplary embodiment of the disclosed systems and methods.

FIG. 5 illustrates a simplified representation of a data center 300 according to one exemplary embodiment of the disclosed systems and methods. As shown in FIG. 5 data center 300 is an enclosed space that contains multiple information handling systems 100 (e.g., mounted in multiple server racks 303a, 303b and 303c) which may be configured in different manner from each other, e.g., such as illustrated and described in relation to FIGS. 4A and 4B as well as other configurations. In FIG. 5, the multiple racks of information handling systems 100 are cooled by an air-conditioning system 310 (e.g., refrigeration unit) that blows refrigerated cooling air into the data center 300 and recirculates the air heated by the server systems 100 via a cooling air return intake 312. As shown by arrows in FIG. 5, cooling fans 190 of each of information handling systems 100 intakes and exhausts cooling air that is heated by internal heat-producing components within a respective chassis enclosure 104 of each information handling system 100. Since air-conditioning system 310 must effectively cool each of the individual information handling systems 100 of FIG. 5, the design, capacity, operation and optimization of air-conditioning system 310 is dependent on the cumulative volumetric airflow rate that passes through each of the chassis enclosures 104 of the multiple information handling systems 100 of FIG. 5.

A data center administrative information handling system 193 is also shown present in data center 300 that is communicatively coupled to monitor and control operation of each of the individual information handling systems 100 shown in FIG. 5, and may receive and/or monitor volumetric airflow rate measured within each of the chassis enclosures 104 of information handling systems 100 using the methodology described further herein. Data center administrative information handling system 193 may also be communicatively coupled to control operation of air-conditioning system 310 including, for example, set point temperature for data center 300. In one embodiment, a data center administrative information handling system 193 may be configured with similar components as described herein for an information handling system 100, and a display device $185_D$ may be coupled as shown to data center administrative information handling system 193 to display monitored information from each of information handling systems 100 in server racks 303a, 303b and 303c. It will be understood that the illustrated configuration of data center 300 (e.g., server racks 303, information handling systems 100, air-conditioning unit 310 and return air path from vent 312, data center administrative information handling system 193, etc.) is exemplary only, and that other configurations are possible (e.g., including provisioning of a data center administrative information handling system 193 outside and/or remotely located from data center 300).

Figure 6:
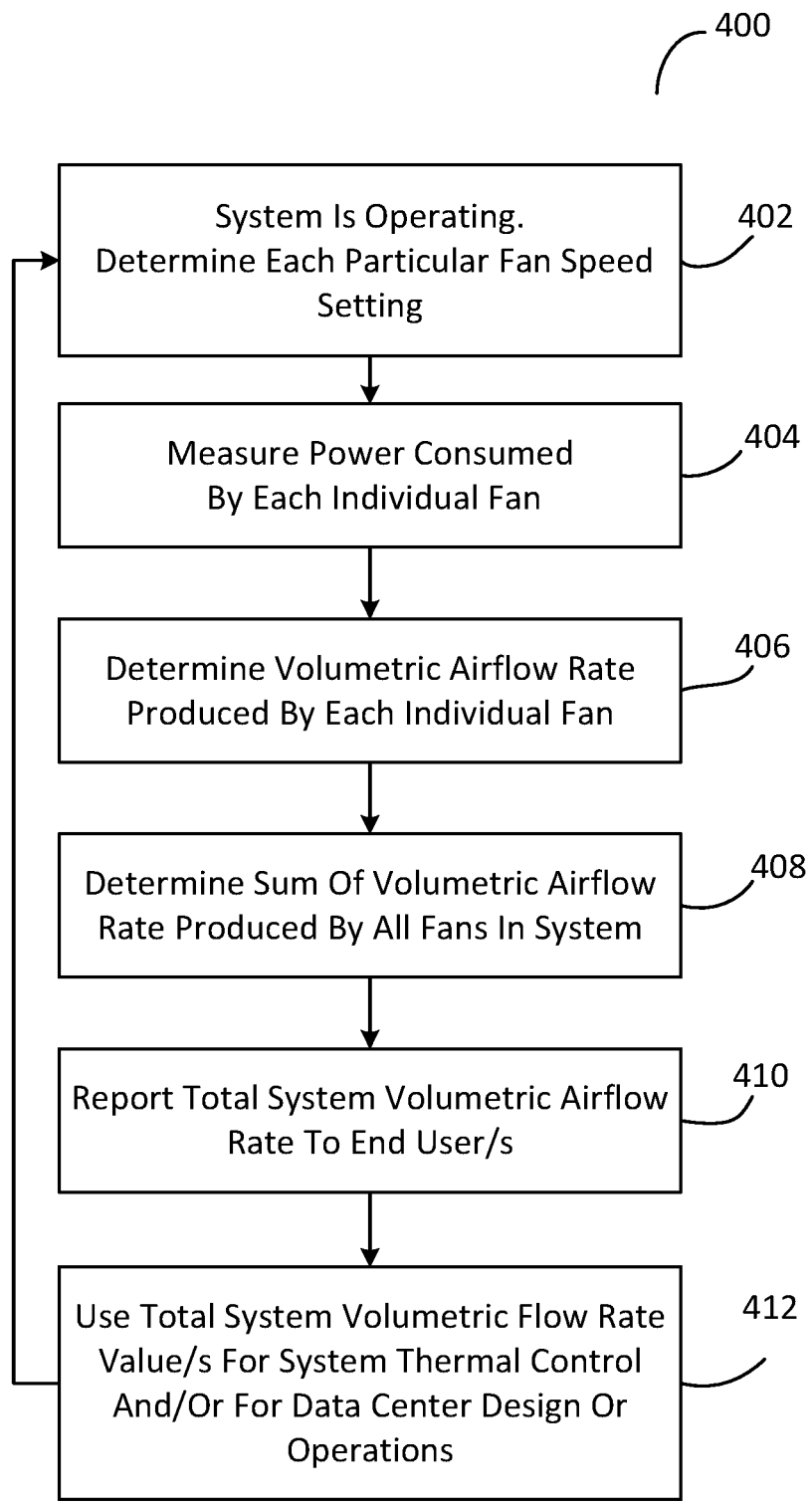
FIG. 6 illustrates methodology according to one exemplary embodiment of the disclosed systems and methods.
Figure 9:
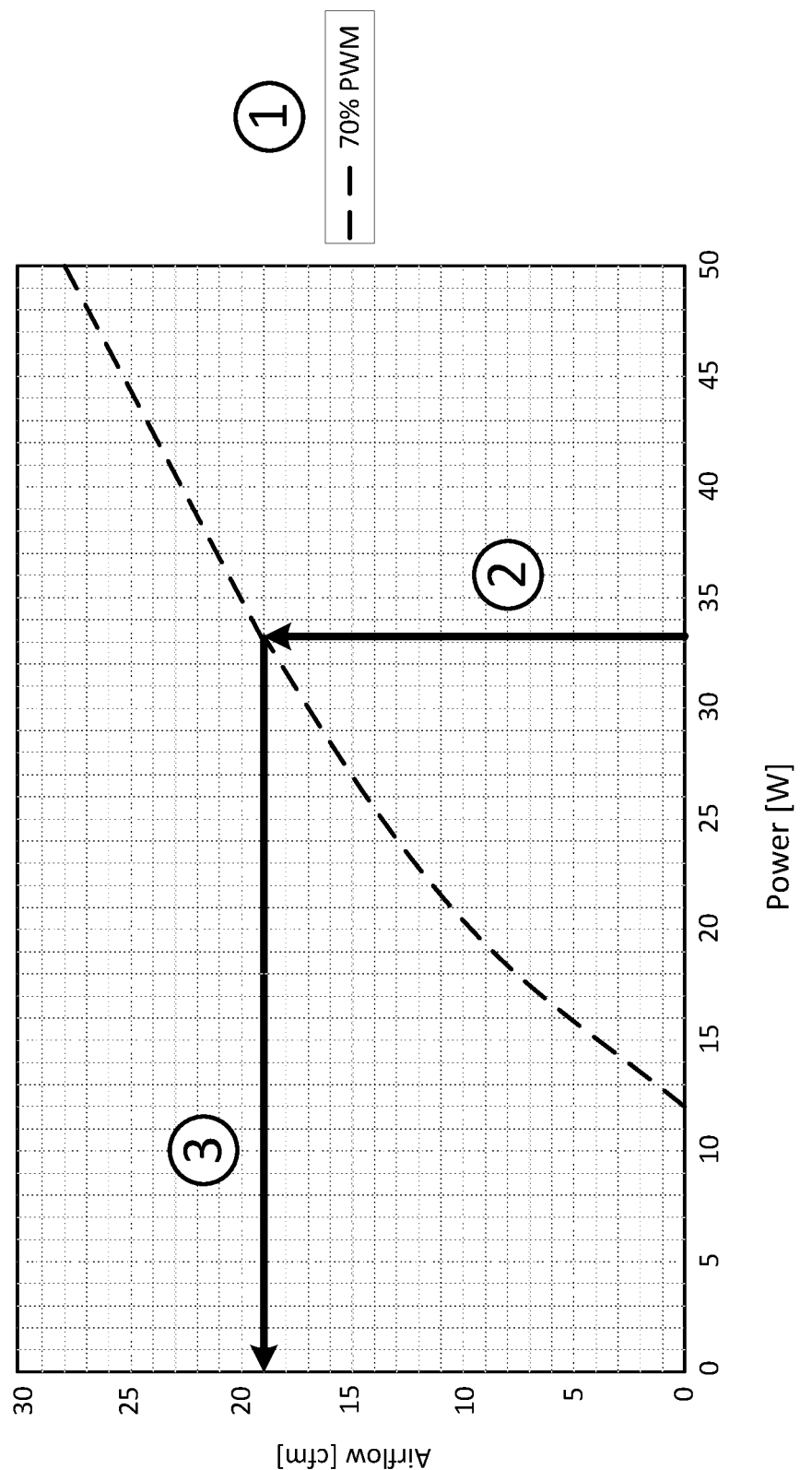
FIG. 9 illustrates a correlation between an individual cooling fan power consumption and volumetric air flow rate according to one exemplary embodiment of the disclosed systems and methods.

FIG. 6 illustrates methodology 400 that may be employed in one exemplary embodiment to determine real time volumetric airflow rate produced by individual cooling fans 190 through a chassis enclosure 104 of an information handling system 100 such as described and illustrated herein. Methodology 400 may be implemented using a correlation of volumetric airflow rate (e.g., cubic feet per minute "CFM") such as shown in FIG. 9, and that may be developed for a single standalone blower fan 190, for example, as illustrated in FIGS. 5 and 6.

It will be understood that the data of the following examples and figures (FIGS. 7, 8, 9 and 11) is exemplary and hypothetical only. This data is illustrative and may not represent an actual system's performance. Further, data for a given system will vary based on the system's actual configuration.

Figure 7:
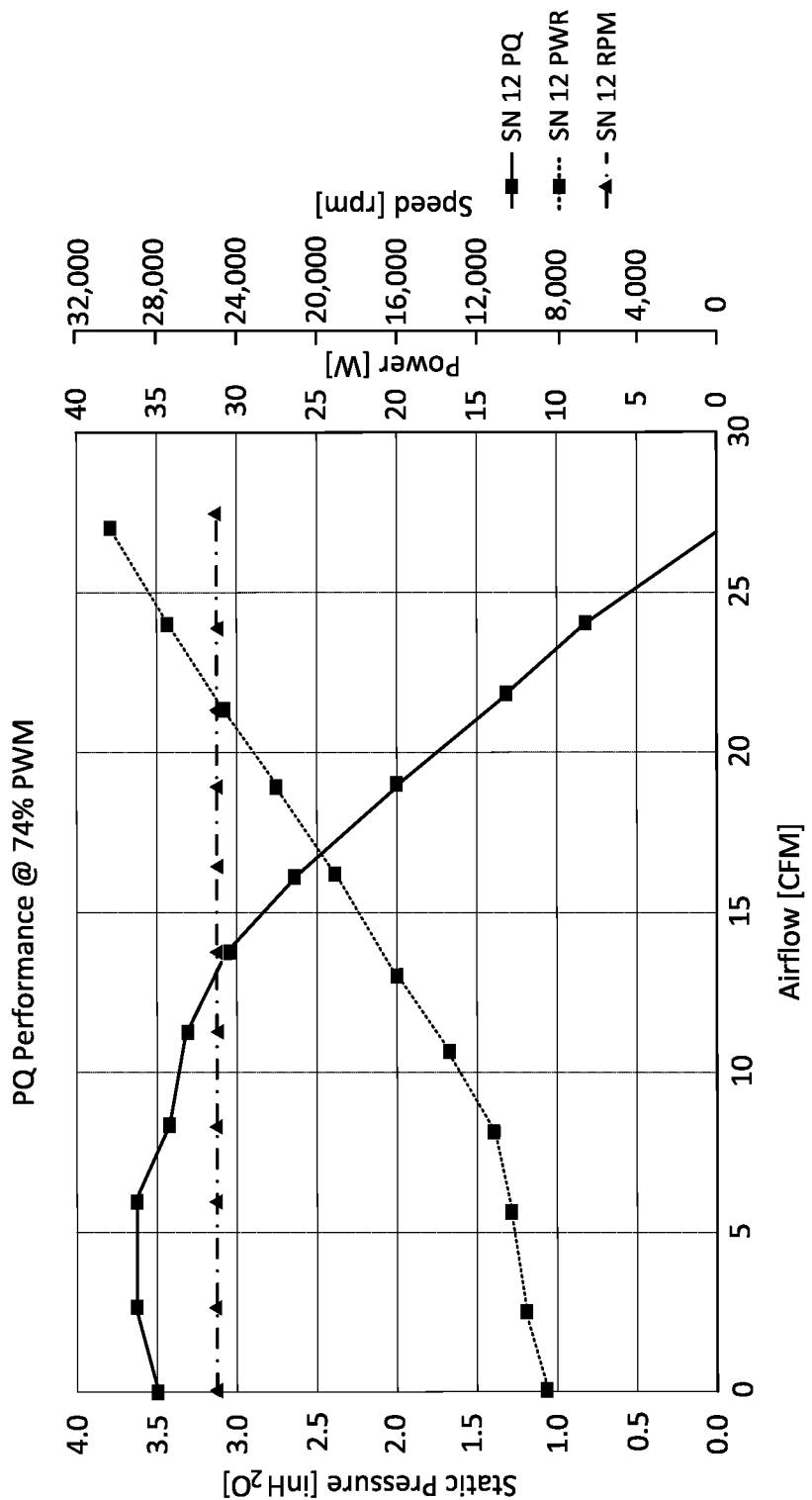
FIG. 7 illustrates an exemplary relationship according to one exemplary embodiment of the disclosed systems and methods.

FIG. 7 illustrates an exemplary fan curve of pressure versus airflow (PQ) for a given configuration of standalone blower-type cooling fan 190 (i.e., that includes a stator, impeller and motor mechanically coupled to the impeller). The data for a relationship such as FIG. 7 may be developed (e.g., in a laboratory setting) by characterizing the given configuration of cooling fan 190 at a given speed control setting, which is 70% PWM in the embodiment of FIG. 7. At a given speed control setting, the cooling fan 190 operates at a fixed rotational speed (e.g., RPM) as shown in FIG. 7. At the fixed rotational speed of FIG. 7, there is a direct relationship between power consumption in watts [W] and a given operating point of static pressure (e.g., inches of water [inH2O]) and volumetric airflow rate (cubic feet per minute [CFM]) on the PQ curve as shown in FIG. 7. Using the PQ relationship of FIG. 7, the volumetric airflow rate produced at the fixed rotational speed by the given configuration of cooling fan 190 may be determined as a function of the operating power consumption of the given configuration of cooling fan 190.

Figure 8:
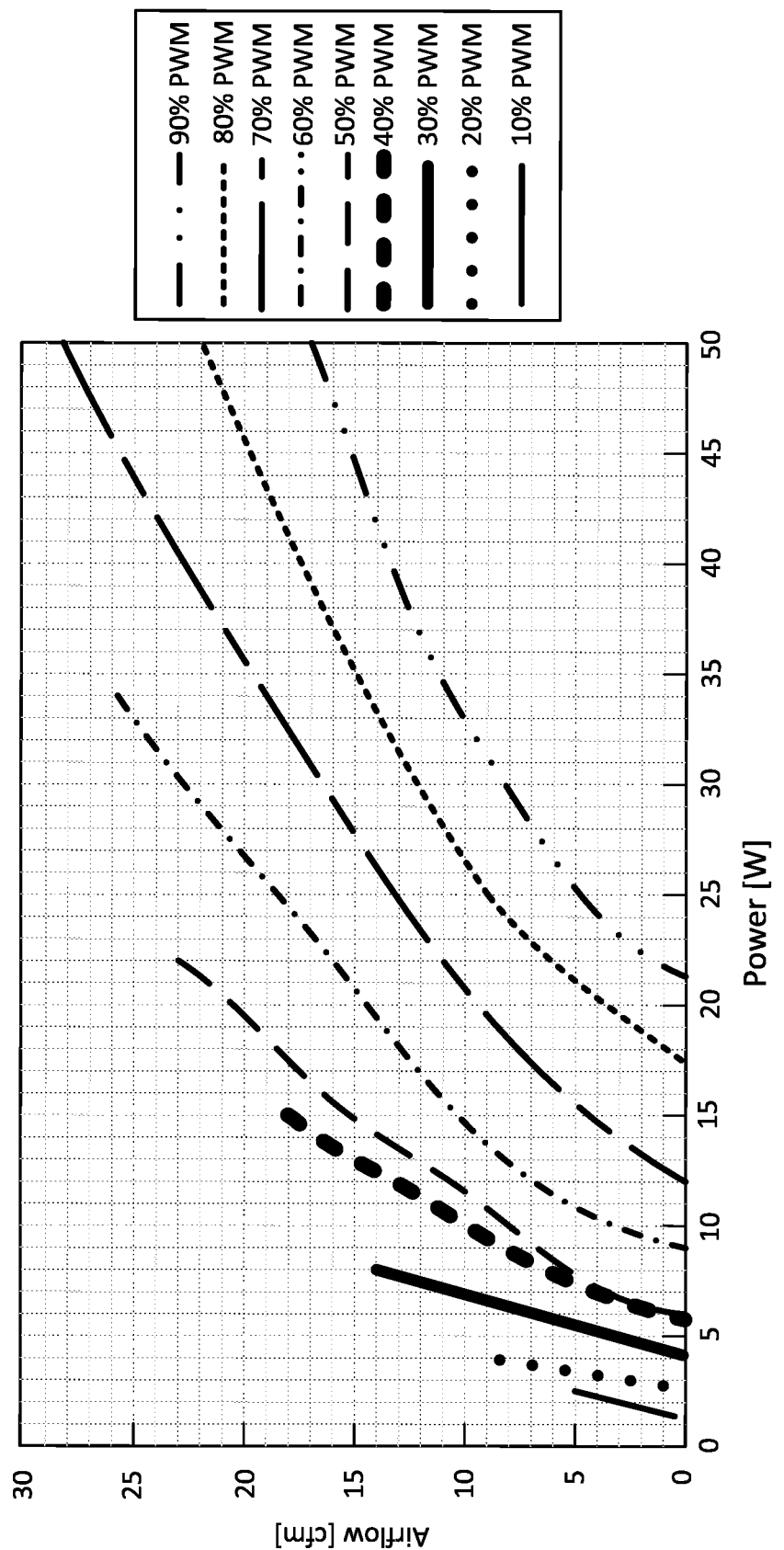
FIG. 8 illustrates an exemplary empirical correlation according to one exemplary embodiment of the disclosed systems and methods.

FIG. 8 illustrates an exemplary empirical correlation that may be created for the three dimensions of fan control speed [% PWM], power [W], and output airflow [CFM] from multiple PQ relationships that are obtained by laboratory characterization of a given configuration (e.g., type, size, motor horsepower, etc.) of cooling fan 190 of information handling system 100 at multiple different fan speed control settings. Curve fitting techniques for laboratory data (e.g., such as least squares analysis, total least squares analysis, polynomial regression, polynomial interpolation, etc.) may be employed to develop curves for the correlations herein, and software tools (e.g., such as MATLAB) may also be employed. In one embodiment, such a correlation may be stored as cooling fan power characteristics 151 in non-volatile memory 140 and used by airflow determination logic 161 of BMC 108 to determine real time volumetric airflow output from a given configuration (e.g., type, size, motor horsepower, etc.) of cooling fan 190 as a function of current power consumption (e.g., measured from the given control fan 190 by BMC 108) and fan control speed (e.g., provided to the given cooling fan 190 by BMC 108). A respective separate and different empirical correlation may similarly be created for the three dimensions of control speed [% PWM], power [W], and output airflow [CFM] from multiple PQ relationships for each other given configuration (e.g., type, size, motor horsepower, etc.) of cooling fan 190 of information handling system 100 by characterizing each other configuration of cooling fan 190 at multiple different speed control settings. Each separate and different empirical correlation may also be stored as cooling fan power characteristics 151 in non-volatile memory 140.

Although the plot of FIG. 8 illustrates an exemplary empirical correlation developed for a finite number of discrete cooling fan control speed points [% PWM], it is alternatively possible to use characterization of a given configuration (e.g., type, size, motor horsepower, etc.) of cooling fan 190 at multiple different speed control settings to develop a continuous equation that expresses volumetric airflow output ([CFM] or CFM) as a function of any given combination of power ([W] or PWR) and cooling fan control speed ([% PWM] or PWM) for a given configuration of cooling fan 190, e.g., of the form: CFM=f(PWR,PWM). Curve fitting techniques for laboratory data (e.g., such as least squares analysis, total least squares analysis, polynomial regression, polynomial interpolation, etc.) may be employed to develop curves for the correlations herein, and software tools (e.g., such as MATLAB) may also be employed. These continuous equations may also be stored as cooling fan power characteristics 151 in non-volatile memory 140, and used by airflow determination logic 161 of BMC 108 to determine real time volumetric airflow output from a given configuration (e.g., type, size, motor horsepower, etc.) of cooling fan 190 as a function of current power consumption (e.g., measured from the given control fan 190 by BMC 108) and fan control speed (e.g., provided to the given cooling fan 190 by BMC 108)

Two example possible continuous equations [1] and [2] are provided below that may be so developed to determine volumetric airflow output ([CFM] or CFM) for a single standalone cooling fan configuration (e.g., cooling fan type, size, motor horsepower, etc.). It will be understood that different equations having different coefficients and/or form may be similarly developed by cooling fan characterization of other different cooling fan configurations.

$$CFM = 17.18 + 0.65*PWR - 0.32*PWM \qquad \text{Equation [1]:}$$

OR $$CFM = 348.95*(PWR^{1.34})*(PWM^{-1.81}) \qquad \text{Equation [2]:}$$

Returning to FIG. 6, method 400 begins in step 402 with each of the cooling fans 190 of the information handling system 100 operating with a particular given fan speed setting, e.g., as set by BMC 108 using a percent pulse wave modulation [% PWM] control signal that corresponds to a given desired fan rotational speed (RPM). In one embodiment, all cooling fans 190 of system 100 may be currently operating with the same rotation or rotational speed, although in another embodiment one or more of cooling fans 190 may currently be operating with a rotational speed that is different from the current rotational speed of one or more of the other cooling fans 190.

In step 402, airflow determination logic 161 of BMC 108 determines the current fan speed setting [% PWM] for each individual cooling fan 190. In this regard, BMC 108 has knowledge of the current particular fan speed setting for each individual cooling fan 190 when the cooling fan speed is set by BMC 108, or BMC 108 may alternatively determine the current fan speed setting for each individual cooling fan 190 from a different programmable integrated circuit of information handling system 100 (e.g., in the case that the current cooling fan speed of each cooling fan 190 is set by the different programmable integrated circuit).

FIG. 9 illustrates an example embodiment of a correlation between an individual cooling fan power consumption and volumetric air flow rate that may be first selected from stored cooling fan characteristics 151 for use by BMC 108 for the configuration (e.g., type, size, motor horsepower, etc.) of a first one of the cooling fans 190 when operating at a given cooling fan rotational speed or fan speed power setting [% PWM]. This selected correlation of FIG. 9 may be used to determine current fan volumetric airflow rate from measured power consumption of the first cooling fan 190 when the determined current fan speed control setting of step 402 for the first cooling fan 190 is a discrete fan speed control setting of 70% PWM (as denoted by the circled number "1" in FIG. 9). Other correlations may be selected from stored cooling fan characteristics 151 for use by BMC 108 for the different configurations and current fan speeds of each of the other of the cooling fans 190 of information handling system 100. However, in another embodiment, a respective continuous equation (e.g., such as of the type of Equation [1] or Equation [2] described herein) may alternatively be selected and used by BMC 108 for each of the different configurations (e.g., different fan types, different fan sizes, different fan motor horsepowers, etc.) of cooling fans 190 to continuously calculate the current fan volumetric airflow rate for any current fan speed of each respective cooling fan 190 based on the current cooling fan power setting and measured cooling fan power consumption that respective cooling fan 190.

Next, in step 404, airflow determination logic 161 of BMC 108 separately reads or measures the power consumed by each individual cooling fan 190 of information handling system 100 (e.g., by using current monitor "IMON" circuitry to measure each individual cooling fan current at the existing cooling fan voltage). In the present example, FIG. 9 illustrates a case where airflow determination logic 161 of BMC 108 determines a current real time electric power consumption of 33 Watts by the first one of the cooling fans 190 of information handling system 100 (as denoted by the circled number "2" in FIG. 9). Airflow determination logic 161 of BMC 108 performs a similar real time power consumption determination of step 404 for each of the other cooling fans 190 of information handling system 100.

Next, in step 406 airflow determination logic 161 of BMC 108 determines the volumetric airflow rate currently produced by each individual cooling fan 190 of information handling system 100. In the present example, FIG. 9 illustrates a case where airflow determination logic 161 of BMC 108 determines a current real time power consumption of 33 Watts by the first one of the cooling fans 190 of information handling system 100 (as denoted by the circled number "2" in FIG. 9). Airflow determination logic 161 of BMC 108 then determines a corresponding current volumetric airflow rate of 19 cubic feet per minute (CFM) that corresponds to the 33 Watts power consumption of the first cooling fan 190 at the current discrete fan speed control setting of 70% PWM for the first cooling fan 190 (as denoted by the circled number "3" in FIG. 9). Airflow determination logic 161 of BMC 108 performs a similar real time volumetric airflow rate determination in step 406 for each of the other cooling fans 190 of information handling system 100, i.e., using an appropriate corresponding correlation between fan power consumption and volumetric air flow rate that is selected for use by BMC 108 for each of the other cooling fans 190 of information handling system 100.

It will be understood that the example current real time power consumption value of 33 Watts and the corresponding current volumetric airflow rate value of 19 CFM of FIG. 9 are only exemplary values for a hypothetical first cooling fan 190, and are given for purposes of illustration only. It will also be understood that airflow determination logic 161 of BMC 108 may determine current real time power consumption values of greater or lesser than 33 Watts (and corresponding volumetric airflow rate values of greater of lesser than 19 CFM), depending for example, on the particular characteristics and configuration and/or type of each different given cooling fan 190. Further, the determined current real time power consumption value and corresponding volumetric airflow rate value for each given cooling fan 190 may be different for different cooling fans 190.

Next, in step 408 airflow determination logic 161 of BMC 108 sums together the real time volumetric air flow rates determined for all of the respective different cooling fans 190 of information handling system 100 to determine (or predict) the single total current volumetric airflow rate (e.g., in CFM) that is currently flowing from all of the cooling fans 190 added together through chassis enclosure 104. In the case where an information handling system 100 includes only a single cooling fan 190, step 408 may be skipped since the determined current volumetric air flowrate of the single fan 190 is equal to the total current volumetric airflow flowing through chassis enclosure 104.

Next, in step 410 airflow reporting logic 163 may optionally report the determined total current volumetric airflow rate of step 408 that is currently flowing through chassis enclosure 104 to one or more end users and/or administrators, e.g., by displaying the total current volumetric airflow rate as a value in a graphical user interface (GUI) on display device 185 of information handling system 100 and/or via network 191 on display device 185$_D$ of data center administrative system 193.

In step 412, thermal control logic 165 of BMC 108 may execute one or more thermal control algorithms that utilize the total current volumetric airflow rate of step 408 to thermally balance current determined volumetric airflow rate generated by cooling fan/s 190 through chassis enclosure 104 with the amount of total heat currently produced by heat-producing components within chassis enclosure 104. As one example, thermal control logic 165 of BMC 108 may increase or decrease the rotational speed [% PWM] of one or more of cooling fans 190 as needed to provide a total current volumetric airflow rate that is calculated to maintain a current target temperature (or temperature range) within chassis enclosure 104. In another example, thermal control logic 165 of BMC 108 may increase or decrease the rotational speed [% PWM] of one or more of cooling fans 190 as needed until cooling fan/s 190 produce a determined volumetric airflow rate through chassis enclosure 104 that falls within a predefined target range of total volumetric airflow rate that is specified for sufficiently cooling the current configuration of heat-producing components within the chassis enclosure 104. In another example, thermal control logic 165 of BMC 108 may perform energy balance thermal control by fixing the total current volumetric airflow rate determined in iterations of step 408 to a selected airflow rate value, and then power capping one or more of the heat-producing components of information handling system 100 in order to control airflow temperature inside the chassis enclosure 104 of information handling system 100.

Additionally or alternatively in step 412, data center administrative system 193 may receive the reported value of current total volumetric airflow rate reported in step 410 from each of separate server systems 100 of FIG. 5, and take one or more control or design operations based on the combined total volumetric airflow rate consumed by all of the server systems 100, e.g., such as by increasing or decreasing the cooling capacity of air conditioning system 310 (e.g., by decreasing or increasing temperature set-point or system blower speed of air conditioning system 310 and/or by planning for needed air conditioning system capacity and performing air flow sizing of air conditioning system 310 to match the combined total volumetric airflow rate consumed by all of the server systems 100) based on the total volumetric airflow rate consumption of all the server systems 100. Methodology 400 may then optionally repeat to step 402 and repeat as shown.

Figure 10:
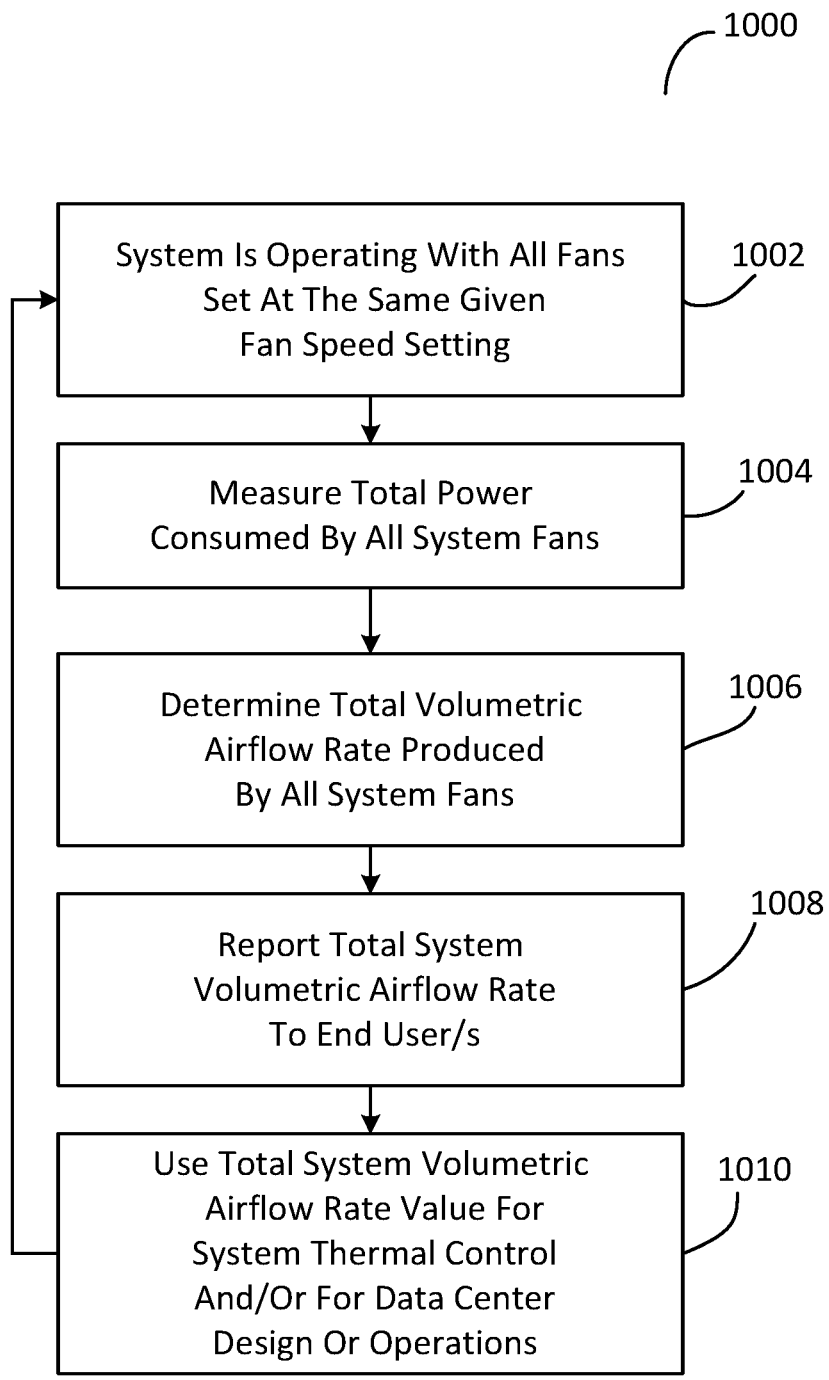
FIG. 10 illustrates methodology according to one exemplary embodiment of the disclosed systems and methods.
Figure 11:
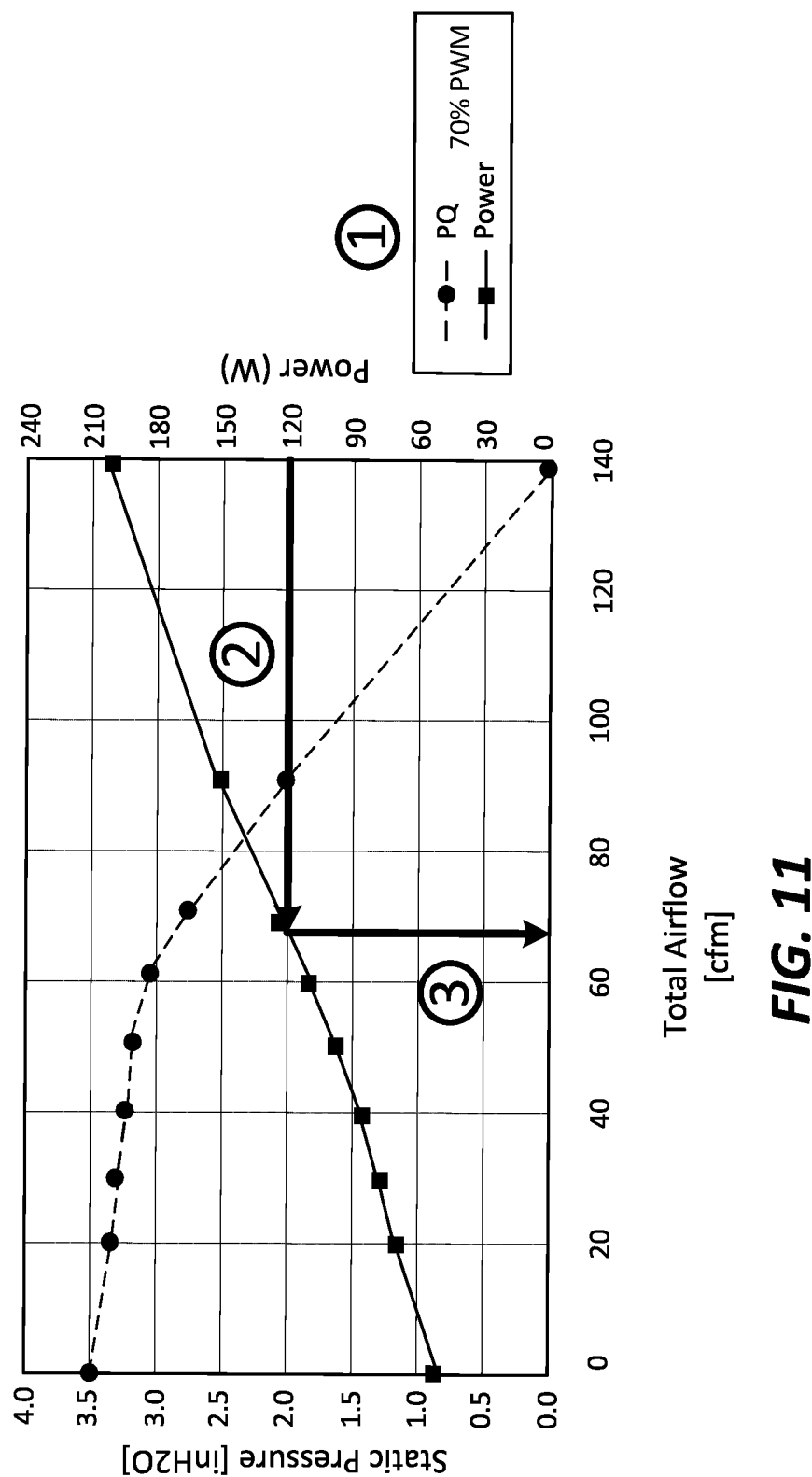
FIG. 11 illustrates a correlation between total system fan power consumption and total system volumetric air flow rate according to one exemplary embodiment of the disclosed systems and methods.

FIG. 10 illustrates methodology 1000 that may be employed in one exemplary embodiment at a system level to determine real time total volumetric airflow rate produced by all cooling fans 190 through a chassis enclosure 104 of an information handling system 100 such as described and illustrated herein. Methodology 1000 may be implemented using a correlation of total system volumetric airflow rate (e.g., cubic feet per minute "CFM") versus total system cooling fan power consumption for a given cooling fan rotational speed, such as shown in FIG. 11. Such a system-level correlation may be developed and defined at a system level for all cooling fans 190 simultaneously operating within chassis enclosure 104 at the same cooling fan speed, but otherwise using the same techniques as previously described in relation to FIGS. 6 and 7 for developing a correlation for a single standalone cooling fan 190.

Method 1000 of FIG. 10 begins in step 1002 with all of the cooling fans 190 of the information handling system 100 controlled by BMC 108 using [% PWM] control signals to operate at the same given rotational fan speed setting. At this time BMC 108 may have knowledge of the current given fan speed setting for all cooling fans 190 when the cooling fan speed is set by BMC 108, or BMC 108 may alternatively determine the current given fan speed setting for all cooling fans 190 from a different programmable integrated circuit of information handling system 100 (e.g., in the case that the current given fan speed setting for all cooling fans 190 is set by the different programmable integrated circuit).

FIG. 11 illustrates an example embodiment of a correlation between total system fan power consumption and total system volumetric air flow rate that may be stored with one or more other correlations as cooling fan power characteristics 151 in non-volatile memory 140. In step 1002 the correlation of FIG. 11 may be first selected from the stored cooling fan characteristics 151 for use by BMC 108 for the current configuration of chassis enclosure 104 (e.g., chassis enclosure dimensions, types and positions of internal components, configurations of cooling fans 190, etc.) for a given cooling fan rotational speed or fan speed setting [% PWM] for all system cooling fans 190. In this embodiment, the correlation of FIG. 11 may be used for a determined current uniform fan speed control setting (e.g., 70% PWM as denoted by the circled number "1" in FIG. 11). Other correlations may be selected from stored cooling fan characteristics 151 for use by BMC 108 for different chassis enclosure configurations and/or uniform fan speed power setting for all cooling fans 190 of information handling system 100.

Next, in step 1004, airflow determination logic 161 of BMC 108 measures total real time power simultaneously consumed by all system cooling fan 190 of information handling system 100 (e.g., by using current monitor "IMON" circuitry to measure total cooling fan current at the existing cooling fan voltage). In the present example, FIG. 11 illustrates a case where airflow determination logic 161 of BMC 108 determines a current total real time power consumption of 120 Watts by simultaneous operation of all the cooling fans 190 of information handling system 100. It will be understood that 120 Watts is only an exemplary value given for purpose of illustration and that determined values of current total real time power consumption may be greater or lesser than 120 Watts depending, for example, on the particular characteristics and configuration of a group of multiple cooling fans 190.

In step 1006, airflow determination logic 161 of BMC 108 determines (or predicts) the current total volumetric airflow rate (e.g., in CFM) that is produced together by all of cooling fans 190 of information handling system 100, which equals the current total volumetric airflow rate that is flowing through chassis enclosure 104. In the present example, FIG. 11 illustrates a case where airflow determination logic 161 of BMC 108 has determined a current total real time power consumption of 120 Watts by simultaneous operation of all the cooling fans 190 of information handling system 100 (as denoted by the circled number "2" in FIG. 11). Airflow determination logic 161 of BMC 108 then determines a corresponding current total volumetric airflow rate of 65 cubic feet per minute that corresponds to the 120 Watts power consumption of all cooling fans 190 at the current fan speed control setting of 70% PWM for all cooling fans 190 (as denoted by the circled number "3" in FIG. 11).

Next, in step 1008 airflow reporting logic 163 may optionally report the determined total volumetric airflow rate of step 1006 that is currently flowing through chassis enclosure 104 to one or more end users and/or administrators, e.g., in a manner similar to described for step 410 of FIG. 12 by displaying the total current volumetric airflow rate as a value in a graphical user interface (GUI) on display device 185 of information handling system 100 and/or via network 191 on display device $185_D$ of data center administrative system 193.

In step 1010, thermal control logic 165 of BMC 108 may execute one or more thermal control algorithms that utilize the total current volumetric airflow rate of step 1006 to thermally balance current determined volumetric airflow rate generated by cooling fan/s 190 through chassis enclosure 104 with the amount of total heat currently produced by heat-producing components within chassis enclosure 104, e.g., in a manner as described previously in relation to step 412 of FIG. 6. Additionally or alternatively in step 1010, data center administrative system 193 may receive the reported value of current total volumetric airflow rate reported in step 1008 from each of separate server systems 100 of FIG. 5, and take one or more control or design operations based on the combined total volumetric airflow rate consumed by all of the server systems 100, e.g., in a manner as described previously in relation to step 412 of FIG. 6. Methodology 1000 may then optionally repeat to step 1002 and repeat as shown.

It will be understood that the particular steps of methodology 400 are exemplary only, and that any combination of fewer, additional and/or alternative steps may be employed that are suitable for determining, reporting and/or using real time volumetric airflow rate produced by individual cooling fans through a chassis enclosure of an information handling system. Likewise, it will be understood that the particular steps of methodology 1000 are exemplary only, and that any combination of fewer, additional and/or alternative steps may be employed that are suitable for determining, reporting and/or using real time total volumetric airflow rate produced by all cooling fans through a chassis enclosure of an information handling system It will understood that one or more of the tasks, functions, or methodologies described herein (e.g., including those described herein for components 103, 106, 108, 109, 117, 119, 121, 140, 150, 193 etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an information handling system or component thereof. The executable instructions may include a plurality of code segments operable to instruct components of an information handling system to perform the methodologies disclosed herein. It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed adapters, systems and methods may be utilized in various combinations and/or independently. Thus the invention is not limited to only those combinations shown herein, but rather may include other combinations.

What is claimed is:

1. An information handling system, comprising:
a chassis enclosure having external walls that define a enclosed interior between the external walls;
one or more cooling air inlets defined through the external walls of the chassis enclosure to be in communication with the enclosed interior of the chassis enclosure;
one or more cooling air outlets defined through the external walls of the chassis enclosure to be in communication with the enclosed interior of the chassis enclosure;
at least one cooling fan configured to operate at multiple rotational speeds to draw cooling air into the enclosed interior of the chassis enclosure through the cooling air inlets from an atmosphere surrounding an outside of the external walls of the chassis enclosure and to circulate the cooling air from the cooling air inlets to the cooling air outlets to provide different flow rates of the cooling air through the enclosed interior of the chassis enclosure to cool one or more heat-producing components within the enclosed interior of the chassis enclosure; and
at least one programmable integrated circuit that is coupled to the at least one cooling fan, the programmable integrated circuit being programmed to:
determine a current real time rotational speed of the at least one cooling fan by obtaining a fan speed setting specified for the at least one cooling fan;
determine a current real time value of electric power consumed by the at least one cooling fan by measuring the electric power consumed by the at least one cooling fan;
determine a current real time volumetric airflow rate of the cooling air circulated by the at least one cooling fan from the cooling air inlets to the cooling air outlets through the enclosed interior of the chassis enclosure as a function of the determined current real time value of electric power consumption of the at least one cooling fan and the determined current rotational speed of the at least one cooling fan; and
control at least one of the at least one cooling fan that circulates the cooling air from the cooling air inlets to the cooling air outlets or the one or more heat generating components to thermally balance the determined current real time volumetric airflow rate of the cooling air circulated from the cooling air inlets to the cooling air outlets through the enclosed interior of the chassis enclosure with an amount of heat currently produced by the one or more heat-producing components within the enclosed interior of the chassis enclosure based on a sensed real time temperature provided from one or more temperature sensors positioned and contained within the enclosed interior of the chassis enclosure between at least one of the cooling air inlets and at least one of the cooling air outlets.

2. The information handling system of claim 1, where the information handling system comprises multiple cooling fans that are each configured to operate at multiple rotational speeds to draw cooling air into the enclosed interior of the chassis enclosure through the cooling air inlets from an atmosphere surrounding an outside of the external walls of the chassis enclosure and to circulate the cooling air from the cooling air inlets to the cooling air outlets to provide different volumetric flow rates of the cooling air through the enclosed interior of the chassis enclosure to cool the one or more heat-producing components within the enclosed interior of the chassis enclosure; where the at least one programmable integrated circuit is coupled to each of the multiple cooling fans; and where the programmable integrated circuit is programmed to perform the following when the multiple cooling fans are simultaneously operating together:
determine a current real time rotational speed of each of the multiple cooling fans and a current real time value of electric power consumed by each of the multiple cooling fans when the multiple cooling fans are operating simultaneously together;
determine a current real time volumetric airflow rate of the cooling air circulated by each given one of the multiple cooling fans from the cooling air inlets to the cooling air outlets through the enclosed interior of the chassis enclosure as a function of the determined current real time value of electric power consumption of the given cooling fan and the determined current rotational speed of the given cooling fan; and
sum together the determined current real time volumetric air flow rates of the cooling air circulated from the cooling air inlets to the cooling air outlets through the enclosed interior of the chassis enclosure by the multiple cooling fans to determine a total current real time volumetric airflow rate of the cooling air circulated from the cooling air inlets to the cooling air outlets through the enclosed interior of the chassis enclosure by all of the multiple cooling fans operating together.

3. The information handling system of claim 1, where the information handling system comprises multiple cooling fans that are each configured to operate at multiple rotational speeds to draw cooling air into the enclosed interior of the chassis enclosure through the cooling air inlets from an atmosphere surrounding an outside of the external walls of the chassis enclosure and to circulate the cooling air from the cooling air inlets to the cooling air outlets to provide different flow rates of the cooling air through the enclosed interior of the chassis enclosure to cool the one or more heat-producing components within the enclosed interior of the chassis enclosure; where the at least one programmable integrated circuit is coupled to each of the multiple cooling fans; and where the programmable integrated circuit is programmed to perform the following when all of the multiple cooling fans are simultaneously operating together at the same common current real time rotational speed:
  determine the common current real time rotational speed at which all of the multiple cooling fans is operating and a current real time total value of electric power consumed together by all of the multiple cooling fans;
  determine a total current real time volumetric airflow rate of the cooling air circulated from the cooling air inlets to the cooling air outlets through the enclosed interior of the chassis enclosure by all of the multiple cooling fans operating together as a function of the determined current real time total value of electric power consumed together by all of the multiple cooling fans and the determined common current rotational speed of all of the multiple cooling fans.

4. The information handling system of claim 1, further comprising non-volatile memory (NVM) coupled to the at least one programmable integrated circuit, the NVM storing multiple relationships between values of electric power consumption of the at least one cooling fan and values of volumetric airflow rate provided by the at least one cooling fan, each of the multiple relationships being defined for a different rotational speed of the at least one cooling fan; and where the at least one programmable integrated circuit is programmed to:
  retrieve one of the stored relationships from the NVM that corresponds to the determined current rotational speed of the at least one cooling fan; and
  determine the current real time volumetric airflow rate of the cooling air circulated from the cooling air inlets to the cooling air outlets through the enclosed interior of the chassis enclosure by the at least one cooling fan to be a volumetric airflow rate value from the retrieved relationship that corresponds to the determined current real time value of electric power consumption of the at least one cooling fan.

5. The information handling system of claim 1, further comprising non-volatile memory (NVM) coupled to the at least one programmable integrated circuit, the NVM storing a continuous equation that expresses volumetric airflow rate of the at least one cooling fan as a function of any given combination of electric power consumption of the at least one cooling fan and rotational speed of the at least one cooling fan; and where the at least one programmable integrated circuit is programmed to:
  retrieve the stored continuous equation from the NVM; and
  determine the current real time volumetric airflow rate of the cooling air circulated from the cooling air inlets to the cooling air outlets through the enclosed interior of the chassis enclosure by the at least one cooling fan by using the retrieved continuous equation to calculate a value of the current real time volumetric airflow rate from the determined current real time value of electric power consumption of the at least one cooling fan and the current real time value of rotational speed of the at least one cooling fan.

6. The information handling system of claim 1, where the at least one programmable integrated circuit is programmed to control at least one of the at least one cooling fan or the one or more heat generating components by performing at least one of:
  varying the rotational speed of the at least one cooling fan to thermally balance the determined current real time volumetric airflow rate of the cooling air circulated by the at least one cooling fan from the cooling air inlets to the cooling air outlets through the enclosed interior of the chassis enclosure with the amount of heat currently produced by the one or more heat-producing components within the enclosed interior of the chassis enclosure; or
  limiting a real time power consumption of the one or more heat-producing components within the enclosed interior of the chassis enclosure to thermally balance the determined current real time volumetric airflow rate of the cooling air circulated from the cooling air inlets to the cooling air outlets through the enclosed interior of the chassis enclosure with the amount of heat currently produced by the one or more heat-producing components within the enclosed interior of the chassis enclosure.

7. The information handling system of claim 1, where the at least one programmable integrated circuit is programmed to report across a network to a remote information handling system a value of the determined current real time volumetric airflow rate of the cooling air circulated from the cooling air inlets to the cooling air outlets through the enclosed interior of the chassis enclosure by the at least one cooling fan.

8. The information handling system of claim 1, further comprising a display device coupled to the at least one programmable integrated circuit; and where the method further comprises displaying on the display device a determined value of the determined current real time volumetric airflow rate of the cooling air circulated from the cooling air inlets to the cooling air outlets through the enclosed interior of the chassis enclosure by the at least one cooling fan.

9. The information handling system of claim 1, where the information handling system is a computer server, and where the at least one programmable integrated circuit is an out-of-band programmable integrated circuit.

10. The information handling system of claim 1, where the at least one cooling at least one cooling fan comprises:
  a given cooling fan configured to draw the cooling air into the enclosed interior of the chassis enclosure through a given one of the cooling air inlets from the atmosphere surrounding the outside of the external walls of the chassis enclosure and to circulate the cooling air from the given cooling air inlet to a given one of the cooling air outlets; and
  where no heat-producing component of the information handling system is disposed within the enclosed interior of the chassis enclosure between the given cooling air inlet and the given cooling air outlet.

11. The information handling system of claim 1, where each of the one or more temperature sensors are positioned at an inlet of a respective Peripheral Component Interconnect Express (PCIe) slot that is positioned and contained within the enclosed interior of the chassis enclosure between at least one of the cooling air inlets and at least one of the cooling air outlets; and where the sensed real time temperature provided from each of the one or more temperature sensors is a real time current temperature at the inlet boundary of a respective PCIe slot.

12. A method, comprising:
providing a chassis enclosure of an information handling system, the chassis enclosure having external walls that define a enclosed interior between the external walls, one or more cooling air inlets defined through the external walls of the chassis enclosure to be in communication with the enclosed interior of the chassis enclosure, and one or more cooling air outlets defined through the external walls of the chassis enclosure to be in communication with the enclosed interior of the chassis enclosure
operating at least one cooling fan to provide airflow within the chassis enclosure of the information handling system to draw cooling air into the enclosed interior of the chassis enclosure through the cooling air inlets from an atmosphere surrounding an outside of the external walls of the chassis enclosure and to circulate the cooling air from the cooling air inlets to the cooling air outlets to cool one or more heat-producing components within the enclosed interior of the chassis enclosure;
determining a current real time rotational speed of the at least one cooling fan by obtaining a fan speed setting specified for the at least one cooling fan;
determining a current real time value of electric power consumed by the at least one cooling fan by measuring the electric power consumed by the at least one cooling fan;
determining a current real time volumetric airflow rate of the cooling air circulated by the at least one cooling fan from the cooling air inlets to the cooling air outlets through the enclosed interior of the chassis enclosure as a function of the determined current real time value of electric power consumption of the at least one cooling fan and the determined current rotational speed of the at least one cooling fan; and
controlling at least one of the at least one cooling fan that circulates the cooling air from the cooling air inlets to the cooling air outlets or the one or more heat generating components within the enclosed interior of the chassis enclosure to thermally balance the determined current real time volumetric airflow rate of the cooling air circulated from the cooling air inlets to the cooling air outlets through the enclosed interior of the chassis enclosure with an amount of heat currently produced by the one or more heat-producing components within the enclosed interior of the chassis enclosure based on a sensed real time temperature provided from one or more temperature sensors positioned and contained within the enclosed interior of the chassis enclosure between at least one of the cooling air inlets and at least one of the cooling air outlets.

13. The method of claim 12, further comprising:
simultaneously operating multiple cooling fans together to draw cooling air into the enclosed interior of the chassis enclosure through the cooling air inlets from an atmosphere surrounding an outside of the external walls of the chassis enclosure and to circulate the cooling air from the cooling air inlets to the cooling air outlets to provide the cooling air of the airflow through the enclosed interior of the chassis enclosure of the information handling system to cool the one or more heat-producing components within the enclosed interior of the chassis enclosure;
determining a current real time rotational speed of each of the multiple cooling fans and a current real time value of electric power consumed by each of the multiple cooling fans;
determining a current real time volumetric airflow rate of the cooling air circulated by each given one of the multiple cooling fans from the cooling air inlets to the cooling air outlets through the enclosed interior of the chassis enclosure as a function of the determined current real time value of electric power consumption of the given cooling fan and the determined current rotational speed of the given cooling fan; and
summing together the determined current real time volumetric air flow rates of the cooling air circulated from the cooling air inlets to the cooling air outlets through the enclosed interior of the chassis enclosure by the multiple cooling fans to determine a total current real time volumetric airflow rate of the cooling air circulated from the cooling air inlets to the cooling air outlets through the enclosed interior of the chassis enclosure by all of the multiple cooling fans operating together.

14. The method of claim 12, further comprising:
simultaneously operating multiple cooling fans together with each of the multiple cooling fans operating at the same common current real time rotational speed to draw cooling air into the enclosed interior of the chassis enclosure through the cooling air inlets from an atmosphere surrounding an outside of the external walls of the chassis enclosure and to circulate the cooling air from the cooling air inlets to the cooling air outlets to provide the cooling air of the airflow through the enclosed interior of the chassis enclosure of the information handling system;
determining the common current real time rotational speed at which all of the multiple cooling fans is operating and a current real time total value of electric power consumed together by all of the multiple cooling fans; and
determining a total current real time volumetric airflow rate of the cooling air circulated from the cooling air inlets to the cooling air outlets through the enclosed interior of the chassis enclosure by all of the multiple cooling fans operating together as a function of the determined current real time total value of electric power consumed together by all of the multiple cooling fans and the determined common current rotational speed of all of the multiple cooling fans.

15. The method of claim 12, further comprising:
selecting a relationship between values of electric power consumption of the at least one cooling fan and values of volumetric airflow rate provided by the at least one cooling fan that corresponds to the determined current rotational speed of the at least one cooling fan, the selected relationship being selected from multiple relationships between values of electric power consumption of the at least one cooling fan and values of volumetric airflow rate provided by the at least one cooling fan, each of the multiple relationships being defined for a different rotational speed of the at least one cooling fan; and
determining a current real time volumetric airflow rate of the cooling air circulated from the cooling air inlets to the cooling air outlets through the enclosed interior of the chassis enclosure by the at least one cooling fan to be a volumetric airflow rate value from the retrieved relationship that corresponds to the determined current real time value of electric power consumption of the at least one cooling fan.

16. The method of claim 12, further comprising determining the current real time volumetric airflow rate of the cooling air circulated from the cooling air inlets to the cooling air outlets through the enclosed interior of the chassis enclosure by the at least one cooling fan by using a continuous equation to calculate a value of the current real time volumetric airflow rate from the determined current real time value of electric power consumption of the at least one cooling fan and the current real time value of rotational speed of the at least one cooling fan, the continuous equation expressing volumetric airflow rate of the at least one cooling fan as a function of any given combination of electric power consumption of the at least one cooling fan and rotational speed of the at least one cooling fan.

17. The method of claim 12, wherein said controlling at least one of the at least one cooling fan and the one or more heat generating components comprises at least one of:
varying the rotational speed of the at least one cooling fan to thermally balance the determined current real time volumetric airflow rate of the cooling air circulated by the at least one cooling fan from the cooling air inlets to the cooling air outlets through the enclosed interior of the chassis enclosure with the amount of heat currently produced by the one or more heat-producing components within the enclosed interior of the chassis enclosure; or
limiting a real time power consumption of the one or more heat-producing components within the enclosed interior of the chassis enclosure to thermally balance the determined current real time volumetric airflow rate of the cooling air circulated from the cooling air inlets to the cooling air outlets through the enclosed interior of the chassis enclosure with the amount of heat currently produced by the one or more heat-producing components within the enclosed interior of the chassis enclosure.

18. The method of claim 12, further comprising reporting across a network to a remote information handling system a value of the determined current real time volumetric airflow rate of the cooling air circulated from the cooling air inlets to the cooling air outlets through the enclosed interior of the chassis enclosure by the at least one cooling fan.

19. The method of claim 12, further comprising displaying on a display device a determined value of the determined current real time volumetric airflow rate of the cooling air circulated from the cooling air inlets to the cooling air outlets through the enclosed interior of the chassis enclosure by the at least one cooling fan.

20. The method of claim 12, further comprising:
determining the current real time volumetric airflow rate of the cooling air circulated by the at least one cooling fan from the cooling air inlets to the cooling air outlets through the enclosed interior of the chassis enclosure to be a volumetric airflow rate value from a relationship between values of electric power consumption of the at least one cooling fan and values of volumetric airflow rate provided by the at least one cooling fan that corresponds to the determined current rotational speed of the at least one cooling fan; and
where the method further comprises predefining the relationship between values of electric power consumption of the at least one cooling fan and values of volumetric airflow rate provided by the at least one cooling fan that corresponds to the determined current rotational speed of the at least one cooling fan by measuring values of electrical power consumption by the at least one cooling fan at different volumetric airflow rates of the least one cooling fan while the at least one cooling fan is operating at a given rotational speed that corresponds to the determined current rotational speed of the at least one cooling fan.

21. The method of claim 20, where the method further comprises:
predefining multiple different relationships between values of electric power consumption of the at least one cooling fan and values of volumetric airflow rate that correspond to different rotational speeds of the at least one cooling fan by measuring values of electrical power consumption by the at least one cooling fan at different volumetric airflow rates of the least one cooling fan while the at least one cooling fan is operating at each of the different rotational speeds; and
then selecting the relationship between values of electric power consumption of the at least one cooling fan and values of volumetric airflow rate provided by the at least one cooling fan that corresponds to the determined current rotational speed of the at least one cooling fan.

22. The method of claim 12, where the information handling system is a computer server.

23. The method of claim 12, where the at least one cooling at least one cooling fan comprises:
a given cooling fan configured to draw the cooling air into the enclosed interior of the chassis enclosure through a given one of the cooling air inlets from the atmosphere surrounding the outside of the external walls of the chassis enclosure and to circulate the cooling air from the given cooling air inlet to a given one of the cooling air outlets; and
where no heat-producing component of the information handling system is disposed within the enclosed interior of the chassis enclosure between the given cooling air inlet and the given cooling air outlet.

24. The method of claim 12, where each of the one or more temperature sensors are positioned at an inlet of a respective Peripheral Component Interconnect Express (PCIe) slot that is positioned and contained within the enclosed interior of the chassis enclosure between at least one of the cooling air inlets and at least one of the cooling air outlets; and where the sensed real time temperature provided from each of the one or more temperature sensors is a real time current temperature at the inlet boundary of a respective PCIe slot.

* * * * *